US011955855B2

(12) United States Patent
Hasegawa

(10) Patent No.: US 11,955,855 B2
(45) Date of Patent: Apr. 9, 2024

(54) MOTOR AND COMPRESSOR

(71) Applicant: FUJITSU GENERAL LIMITED, Kanagawa (JP)

(72) Inventor: Tomooki Hasegawa, Kanagawa (JP)

(73) Assignee: FUJITSU GENERAL LIMITED, Kanagawa (JP)

(*) Notice: Subject to any disclaimer, the term of this patent is extended or adjusted under 35 U.S.C. 154(b) by 496 days.

(21) Appl. No.: 17/276,372

(22) PCT Filed: Sep. 11, 2019

(86) PCT No.: PCT/JP2019/035652
§ 371 (c)(1),
(2) Date: Mar. 15, 2021

(87) PCT Pub. No.: WO2020/059586
PCT Pub. Date: Mar. 26, 2020

(65) Prior Publication Data
US 2022/0045569 A1 Feb. 10, 2022

(30) Foreign Application Priority Data
Sep. 18, 2018 (JP) .................. 2018-174096

(51) Int. Cl.
*H02K 3/28* (2006.01)
*H02K 3/24* (2006.01)
(Continued)

(52) U.S. Cl.
CPC .......... *H02K 3/28* (2013.01); *H02K 3/24* (2013.01); *H02K 3/30* (2013.01); *H02K 3/52* (2013.01)

(58) Field of Classification Search
CPC .............. H02K 3/28; H02K 3/24; H02K 3/30
See application file for complete search history.

(56) References Cited

U.S. PATENT DOCUMENTS 6,288,462 B1  9/2001 Tanaka et al.
9,419,487 B2* 8/2016 Yazaki .................. H02K 3/522
(Continued)

FOREIGN PATENT DOCUMENTS

CN     2655494 Y    11/2004
CN     1788402 A     6/2006
(Continued)

OTHER PUBLICATIONS

Nov. 30, 2023, Chinese Office Action issued for related CN Application No. 201980060734.X.

*Primary Examiner* — Robert W Horn
(74) *Attorney, Agent, or Firm* — Paratus Law Group, PLLC

(57) ABSTRACT

A motor includes a rotor, and a stator that generates a magnetic field to rotate the rotor. The stator includes a plurality of teeth, a plurality of winding wires including a winding portion wound around each of the plurality of teeth, a neutral wire provided on one end side of the winding portion, and a power wire provided on the other end side of the winding portion, and a plurality of neutral points at which a plurality of the neutral wires is electrically connected by connection terminals. The plurality of neutral wires includes a plurality of first fixation portions in which the plurality of neutral wires is fixed to each other in positions that are on a winding portion side compared to the plurality of neutral points, and a second fixation portion in which the plurality of neutral wires is fixed to each other from the plurality of first fixation portions to the plurality of neutral points.

9 Claims, 17 Drawing Sheets

(51) Int. Cl.
*H02K 3/30* (2006.01)
*H02K 3/52* (2006.01)

(56) References Cited

U.S. PATENT DOCUMENTS

| | | | | |
|---|---|---|---|---|
| 10,348,148 B2* | 7/2019 | Takei | ........................ | H02K 3/38 |
| 10,615,656 B2* | 4/2020 | Haga | ........................ | H02K 3/28 |
| 10,622,861 B2* | 4/2020 | Hashimoto | .............. | H02K 3/28 |
| 11,245,301 B2* | 2/2022 | Iga | ........................... | H02K 3/28 |
| 2007/0007832 A1 | 1/2007 | Ichikawa et al. | | |
| 2008/0197742 A1* | 8/2008 | Vollmer | ................... | H02K 3/28 |
| | | | | 310/156.01 |
| 2015/0035397 A1 | 2/2015 | Okinaga et al. | | |
| 2016/0036280 A1* | 2/2016 | Matt | ........................ | H02K 3/38 |
| | | | | 310/71 |
| 2016/0276890 A1 | 9/2016 | Fukuda et al. | | |
| 2022/0045569 A1* | 2/2022 | Hasegawa | ................. | H02K 3/52 |
| 2022/0140687 A1* | 5/2022 | Hasegawa | ............... | F04B 39/00 |
| | | | | 62/401 |

FOREIGN PATENT DOCUMENTS

| | | |
|---|---|---|
| CN | 104170215 A | 11/2014 |
| CN | 105449884 A | 3/2016 |
| CN | 105706339 A | 6/2016 |
| CN | 107710559 A | 2/2018 |
| JP | 2001-231205 A | 8/2001 |
| JP | 2004-328917 A | 11/2004 |
| JP | 2010-166643 A | 7/2010 |
| JP | 2011-078287 A | 4/2011 |
| JP | 2014-068480 A | 4/2014 |
| JP | 2018-133952 A | 8/2018 |
| KR | 10-2007-0037058 A | 2/2007 |

* cited by examiner

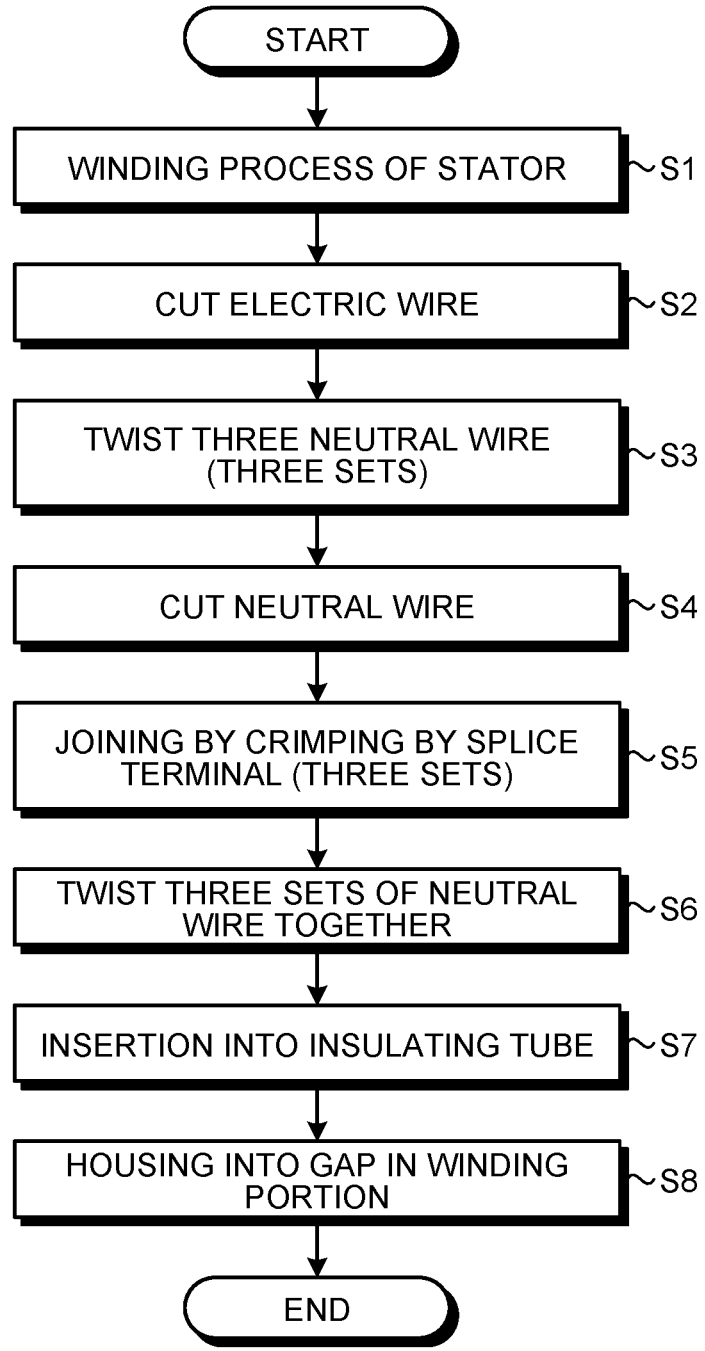

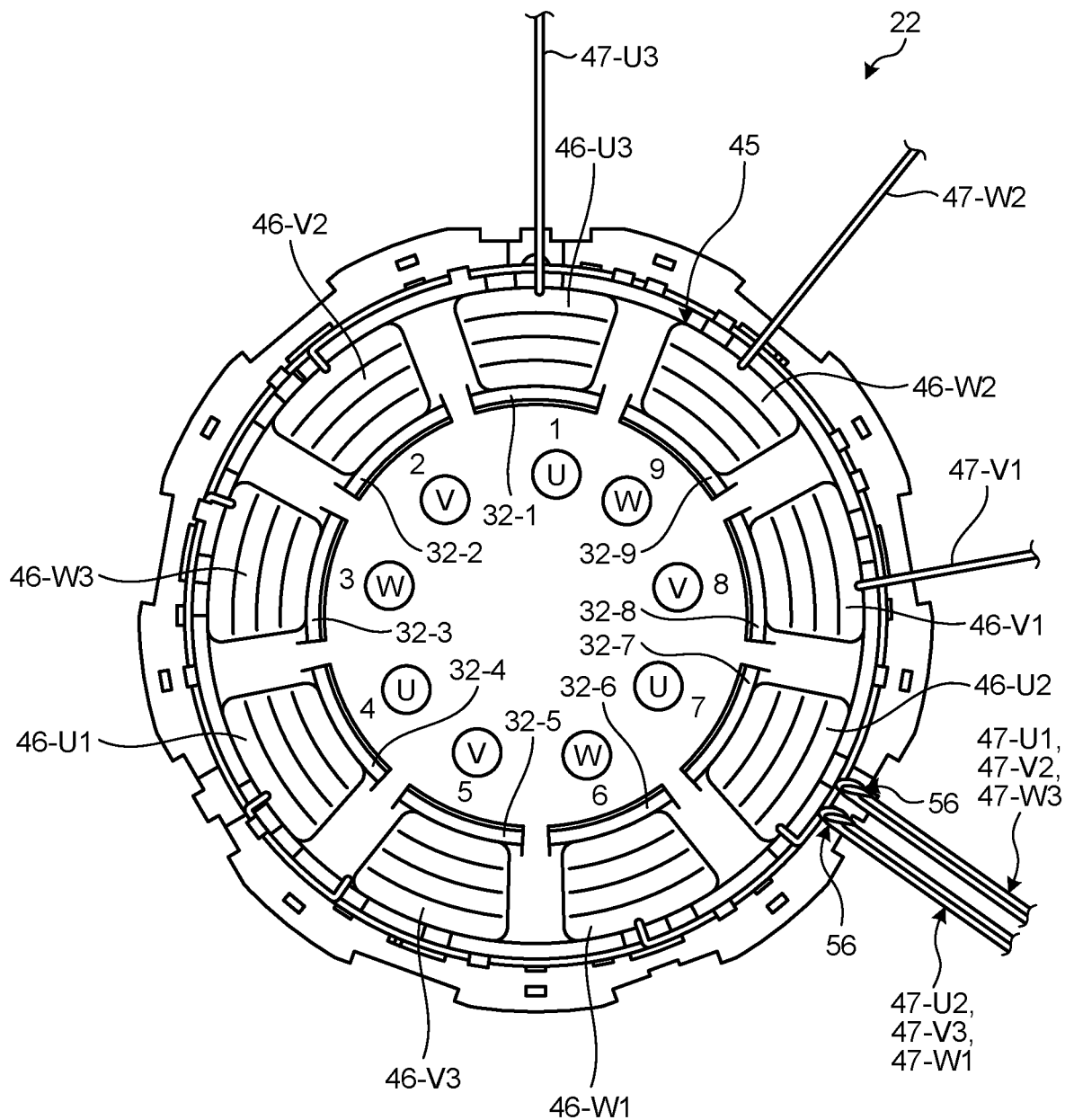

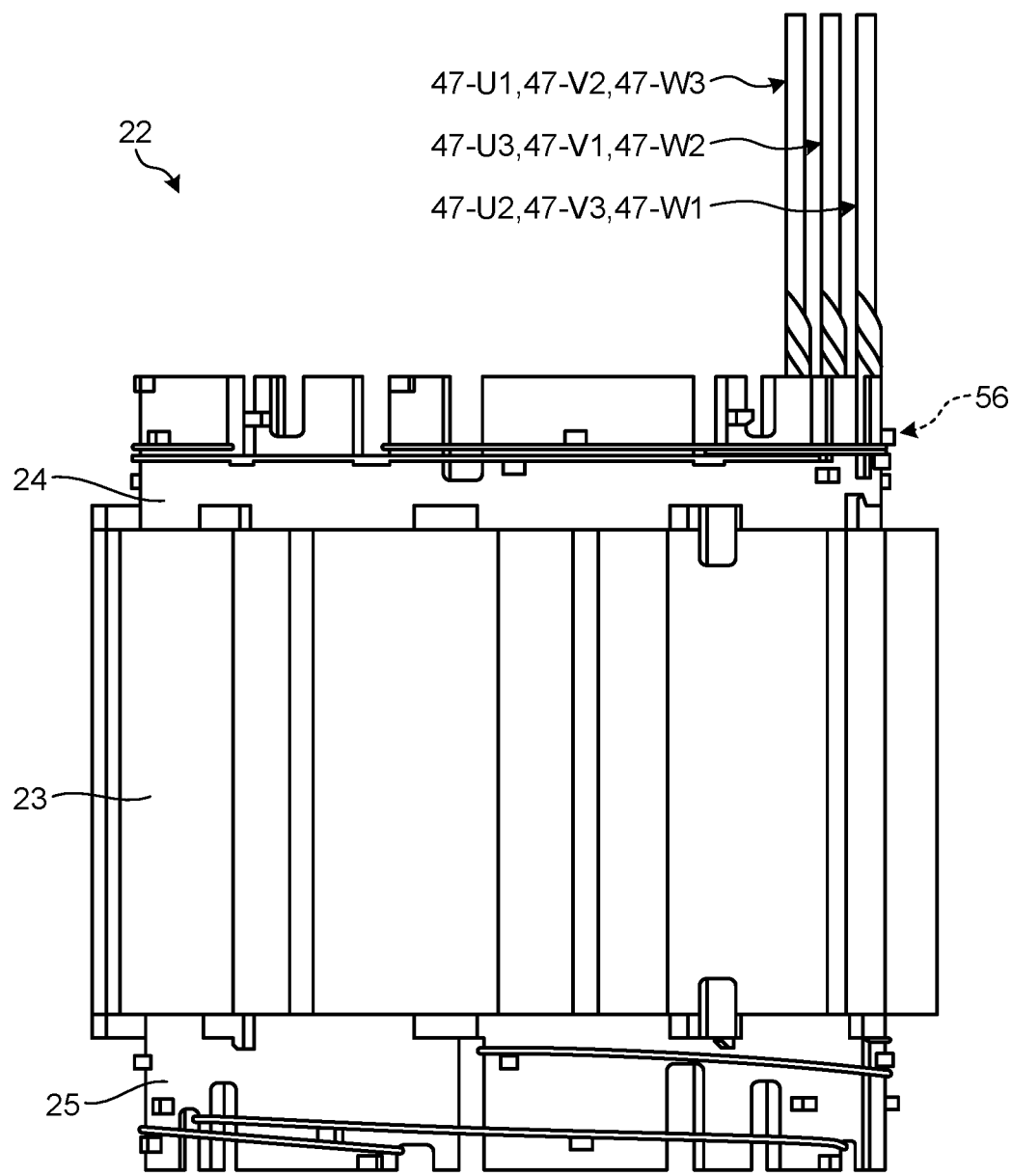

MOTOR AND COMPRESSOR

CROSS REFERENCE TO PRIOR APPLICATION

This application is a National Stage Patent Application of PCT International Patent Application No. PCT/JP2019/035652 (filed on Sep. 11, 2019) under 35 U.S.C. § 371, which claims priority to Japanese Patent Application No. 2018-174096 (filed on Sep. 18, 2018), which are all hereby incorporated by reference in their entirety.

FIELD

The present invention relates to a motor and a compressor.

BACKGROUND

For example, a compressor includes a motor to drive a compression unit that compresses a refrigerant. The motor includes a rotor provided with a permanent magnet, and a stator that rotates the rotor by generating a rotating magnetic field, and transmits rotational power to a compression unit via a shaft fixed to the rotor. The stator has a plurality of teeth, and a winding wire is formed by winding of an electric wire around each of the plurality of teeth. In the winding wire, a plurality of winding portions respectively wound around the teeth, is star-connected (starlike-connected. One end of a winding portion wound around a tooth, is connected to a power supply, and the other end of the winding portion (referred to as neutral wire) is connected to a neutral point.

CITATION LIST

Patent Literature

Patent Literature 1: Japanese Patent Application Laid-open No. 2010-166643

SUMMARY

Technical Problem

For example, in a case of a nine-slot three-phase motor, there is a case where nine neutral wires are bundled and joined by soldering in order that each neutral wire is connected at a neutral point. In a case where soldering is performed, an insulating film of an electric wire needs to be peeled off, and workability in assembling of a motor is low. Thus, instead of joining by soldering, it has been proposed to join neutral wires by crimping with a caulking machine via a connection terminal.

In a case where neutral wires are joined by crimping, it becomes difficult to properly join each neutral wire in a case where four or more neutral wires are bundled. Thus, it is preferable to crimp three neutral wires at a time. Thus, in a case where nine neutral wires are connected at neutral points, bundles of three sets of neutral wires are generated with three neutral wires as one set. Thus, since wires are connected with every predetermined three neutral wires as a combination and three sets of neutral wires are handled in a motor assembling process, there is a problem that handling of the nine neutral wires becomes complicated, workability in the assembling is decreased, and a wire connection variation in a motor is generated.

The disclosed technology has been made in view of the above, and is to provide a motor and a compressor capable of improving workability in assembling of the motor.

Solution to Problem

To solve the above problem and attain the object, a motor disclosed in this application, according to an aspect, includes: a rotor; and a stator that generates a magnetic field to rotate the rotor, wherein the stator includes a plurality of teeth, a plurality of winding wires including a winding portion wound around each of the plurality of teeth, a neutral wire provided on one end side of the winding portion, and a power wire provided on the other end side of the winding portion, and a plurality of neutral points at which a plurality of the neutral wires is electrically connected via connecting members, and the plurality of neutral wires includes a plurality of first fixation portions in which the plurality of neutral wires is fixed to each other in positions that are on a side of the winding portion compared to the plurality of neutral points, and a second fixation portion in which the plurality of neutral wires is fixed to each other from the plurality of first fixation portions to the plurality of neutral points.

Advantageous Effects of Invention

According to an aspect of a motor disclosed in the present application, workability in assembling of the motor can be improved.

BRIEF DESCRIPTION OF DRAWINGS

FIG. 9 is a flowchart for describing a manufacturing process of the stator in the embodiment.

FIG. 10C is a plan view illustrating a state in which a first fixation portion is formed by three neutral wires among the remaining six neutral wires in the embodiment.

FIG. 11A is a side view illustrating a state in which lengths of the three sets of neutral wires are made to be the same in the embodiment.

DESCRIPTION OF EMBODIMENTS

In the following, embodiments of a motor disclosed in the present application will be described in detail on the basis of the drawings. Note that the motor disclosed in the present application is not limited by the following embodiments.

Embodiment

Figure 1:
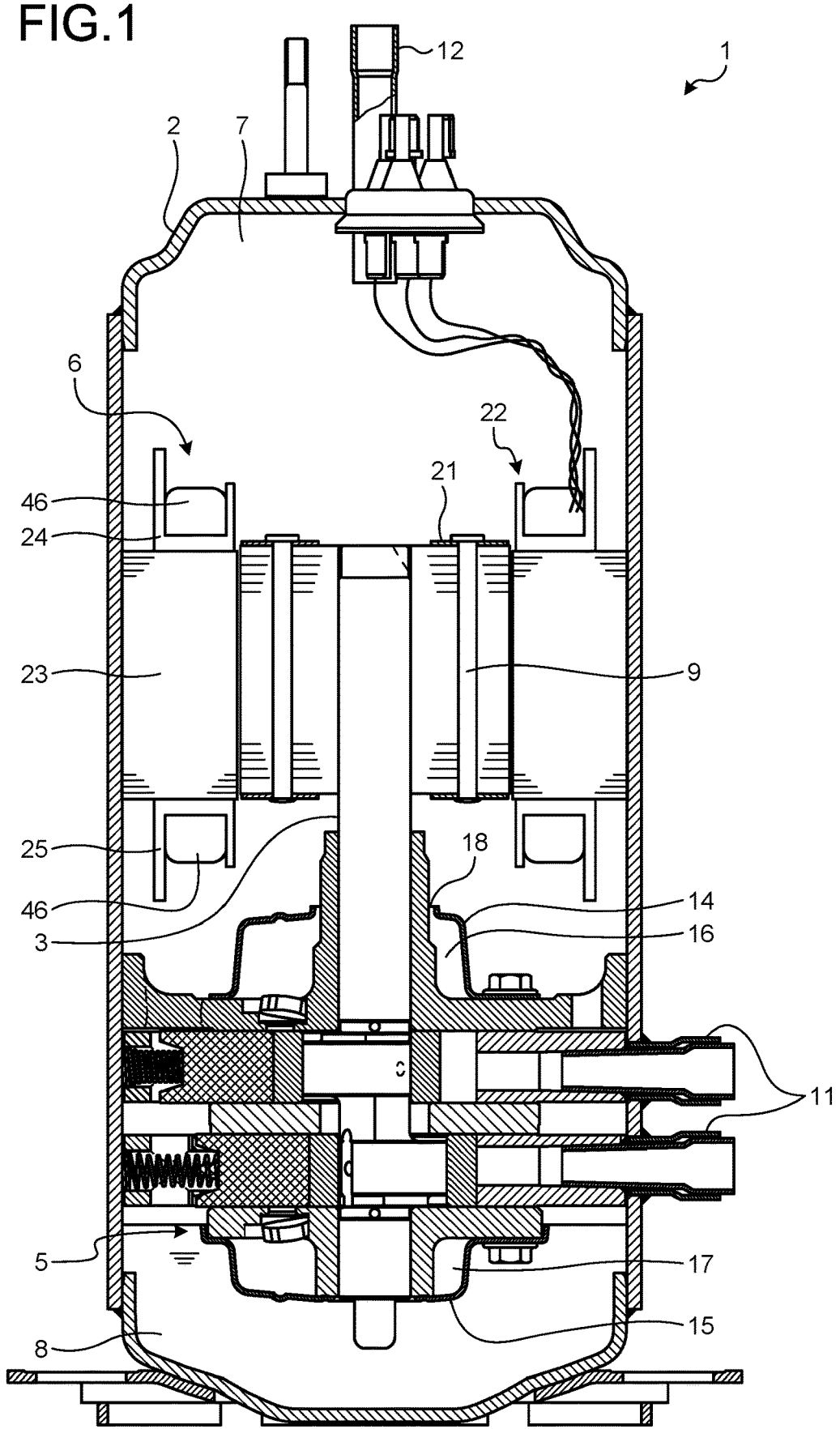
FIG. 1 is a longitudinal sectional view illustrating a compressor including a three-phase motor of an embodiment.

FIG. 1 is a longitudinal sectional view illustrating a compressor including a three-phase motor of an embodiment. As illustrated in FIG. 1, a compressor 1 is a so-called rotary compressor, and includes a container 2, a shaft 3, a compression unit 5, and a three-phase motor 6. The container 2 forms a closed internal space 7. The internal space 7 is formed in a substantially columnar shape. The container 2 is formed in such a manner that a central axis of a column, which forms the internal space 7, is parallel to a vertical direction when vertically placed on a horizontal plane. In the container 2, an oil reservoir 8 is formed in a lower part of the internal space 7. Refrigeration oil, which is a lubricating oil to lubricate the compression unit 5, is stored in the oil reservoir 8. A suction pipe 11 for sucking a refrigerant and a discharge pipe 12 for discharging a compressed refrigerant are connected to the container 2. The shaft 3 as a rotating shaft, is formed in a rod shape, and is arranged in the internal space 7 of the container 2 in such a manner that one end thereof is arranged in the oil reservoir 8. The shaft 3 is supported by the container 2 in a manner of being rotatable around the central axis of the column forming the internal space 7. By being rotated, the shaft 3 supplies the refrigeration oil stored in the oil reservoir 8 to the compression unit 5.

The compression unit 5 is arranged in the lower part of the internal space 7 and is arranged on an upper side of the oil reservoir 8. The compressor 1 further includes an upper muffler cover 14 and a lower muffler cover 15. The upper muffler cover 14 is arranged in an upper part of the compression unit 5 in the internal space 7. The upper muffler cover 14 forms an upper muffler chamber 16 inside. The lower muffler cover 15 is provided in a lower part of the compression unit 5 in the internal space 7, and is arranged in the upper part of the oil reservoir 8. The lower muffler cover 15 forms a lower muffler chamber 17 inside. The lower muffler chamber 17 communicates with the upper muffler chamber 16 via a communication passage (not illustrated) formed in the compression unit 5. A compressed refrigerant discharge hole 18 is formed between the upper muffler cover 14 and the shaft 3, and the upper muffler chamber 16 communicates with the internal space 7 via the compressed refrigerant discharge hole 18.

The compression unit 5 compresses a refrigerant supplied by a rotation of the shaft 3 from the suction pipe 11, and supplies the compressed refrigerant to the upper muffler chamber 16 and the lower muffler chamber 17. The refrigerant is compatible with a refrigeration oil. The three-phase motor 6 is arranged in the upper part of the compression unit 5 in the internal space 7.

Figure 2:
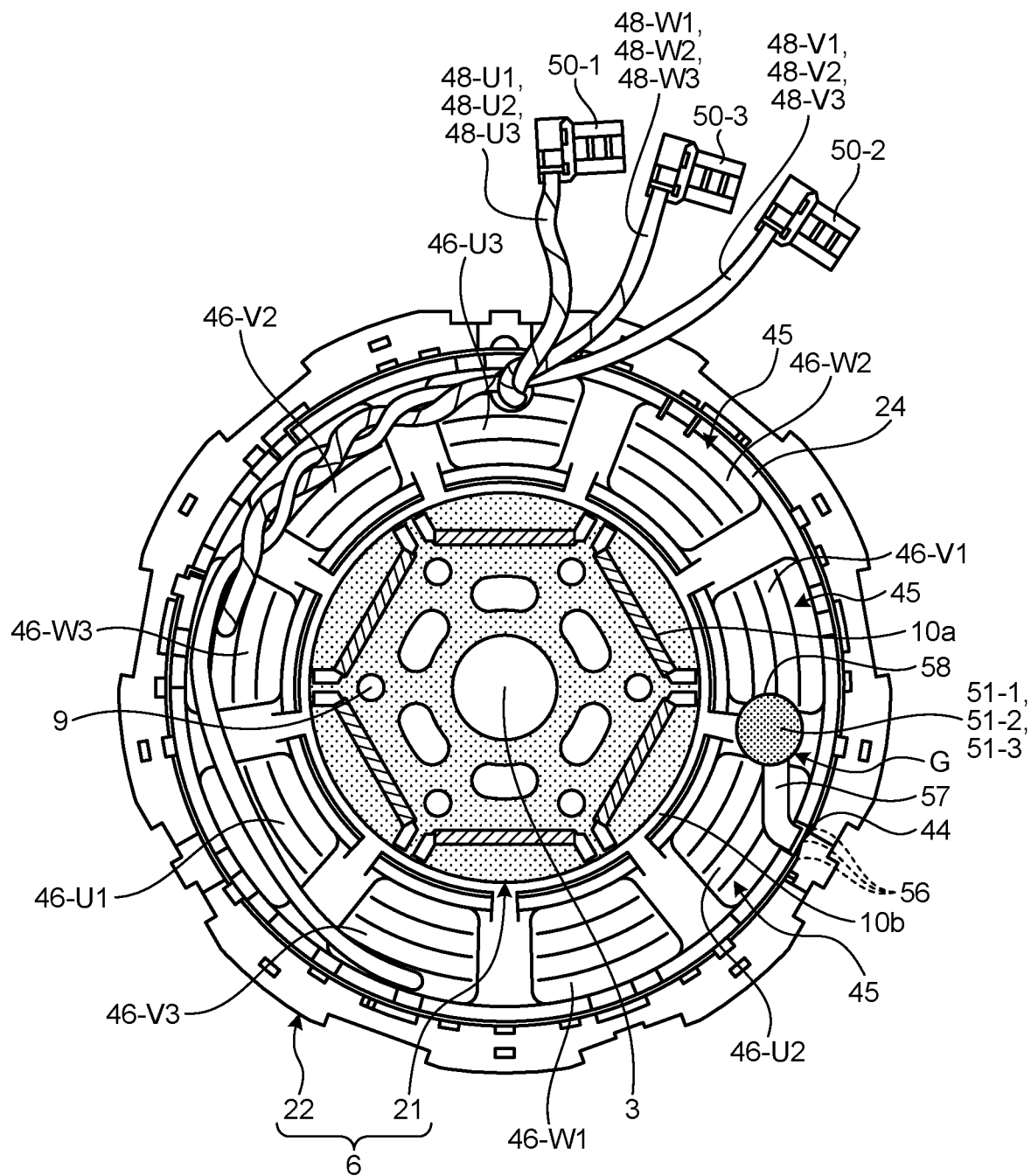
FIG. 2 is a plan view illustrating the three-phase motor of the embodiment from a side of an upper insulator.

FIG. 2 is a plan view illustrating the three-phase motor 6 in the embodiment from a side of the upper insulator. As illustrated in FIG. 1 and FIG. 2, the three-phase motor 6 includes a rotor 21 and a stator 22. The rotor 21 is formed in a columnar shape by lamination of a plurality of thin silicon steel plates (magnetic material), and is integrated by a plurality of rivets 9. In the rotor 21 in which the shaft 3 is inserted and fixed, six slit-shaped magnet embedding holes 10a are formed at a center of the rotor 21 in such a manner as to form each side of a hexagon with the shaft 3 as a center. The magnet embedding holes 10a are formed at predetermined intervals in a circumferential direction of the rotor 21. A plate-shaped permanent magnet 10b is embedded in the magnet embedding holes 10a.

The stator 22 is formed in a substantially cylindrical shape, is arranged in such a manner as to surround the rotor 21, and is fixed to the container 2. The stator 22 includes a stator core 23, an upper insulator 24, a lower insulator 25, and a plurality of winding wires 46. The upper insulator 24 is fixed to an upper part of the stator core 23. The lower insulator 25 is fixed to a lower part of the stator core 23. The upper insulator 24 and the lower insulator 25 are examples of insulating portions that insulate the stator core 23 and the winding wires 46.

Figure 3:
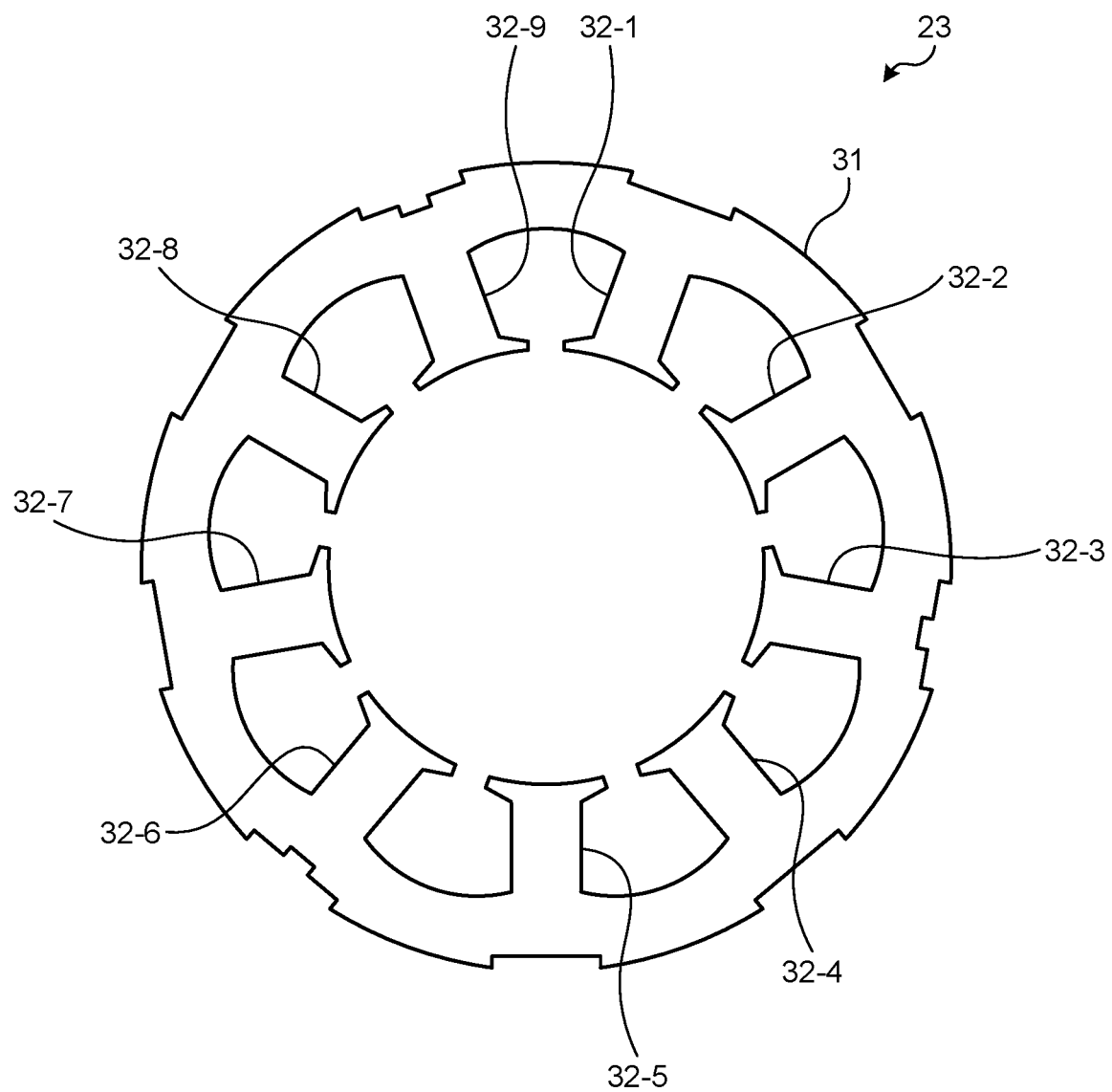
FIG. 3 is a bottom view illustrating a stator core in the embodiment.

FIG. 3 is a bottom view illustrating the stator core 23 in the embodiment. The stator core 23 is formed by lamination of a plurality of plates made of a soft magnetic material such as a silicon steel plate, and includes a yoke portion 31 and a plurality of stator core tooth portions 32-1 to 32-9 as illustrated in FIG. 3. The yoke portion 31 is formed in a substantially cylindrical shape. A first stator core tooth portion 32-1 of the plurality of stator core tooth portions 32-1 to 32-9, is formed in a substantially pillar shape. One end of the first stator core tooth portion 32-1 is formed continuously with an inner peripheral surface of the yoke portion 31, that is, formed in such a manner as to project from the inner peripheral, surface of the yoke portion 31. The stator core tooth portions other than the first, stator core tooth portion 32-1 among the plurality of stator core tooth portions 32-1 to 32-9, are also formed in a substantially pillar shape similarly to the first stator core tooth portion 32-1, and protrude from the inner peripheral surface of the yoke portion 31. The plurality of stator core tooth portions 32-1 to 32-9 are arranged at equal intervals of 40 degrees on the inner peripheral surface of the yoke portion 31.

Figure 4:
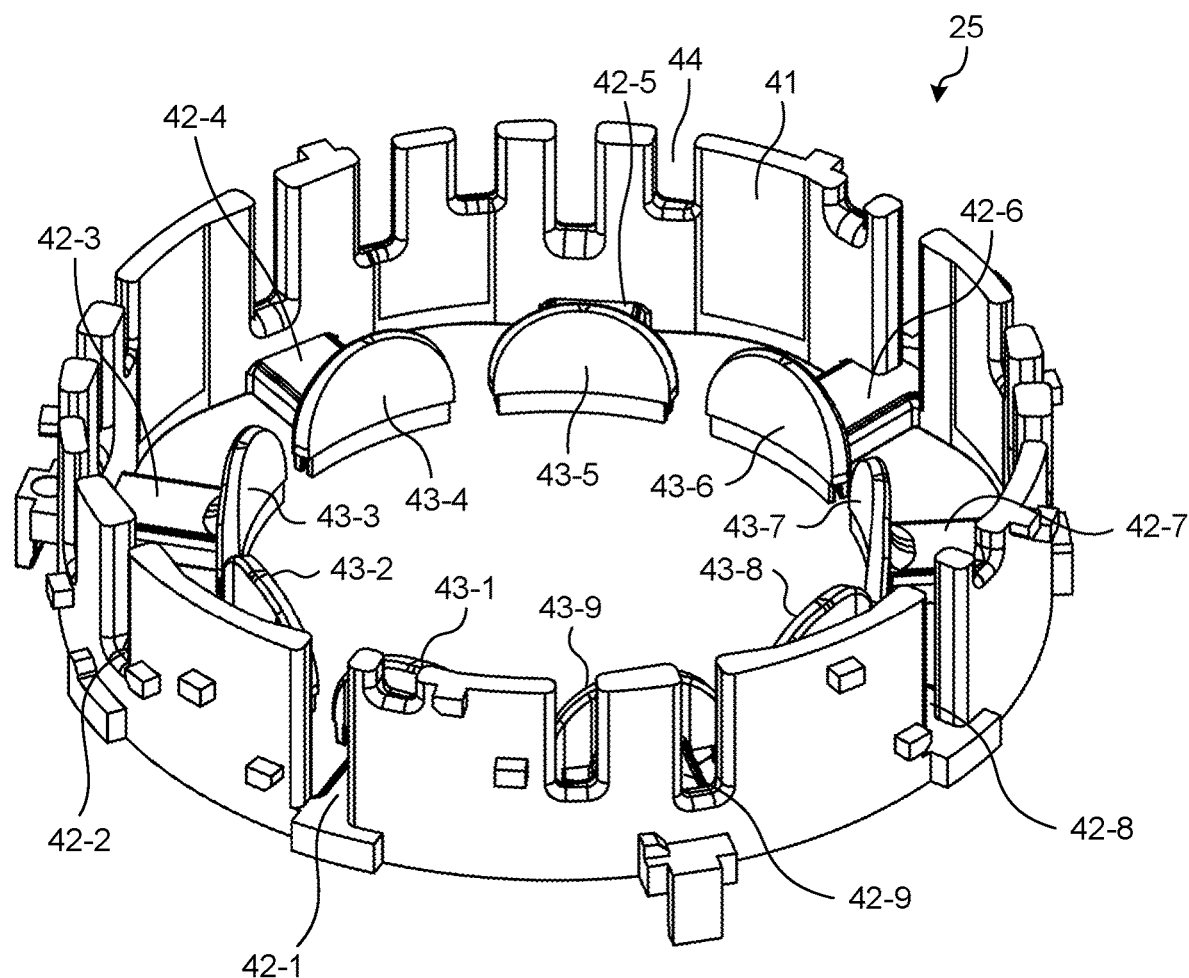
FIG. 4 is a perspective view illustrating a lower insulator in the embodiment.

FIG. 4 is a perspective view illustrating the lower insulator 25 in the embodiment. The lower insulator 25 is formed of an insulator such as a polybutylene terephthalate resin (PBT), and includes an outer peripheral wall portion 41, a plurality of insulator tooth portions 42-1 to 42-9, and a plurality of flange portions 43-1 to 43-9 as illustrated in FIG. 4. The outer peripheral wall portion 41 is formed in a substantially cylindrical shape. A plurality of slits 44 is formed in the outer peripheral wall portion 41. A first insulator tooth portion 42-1 among the plurality of insulator tooth portions 42-1 to 42-5, is formed in a straight pillar shape having a substantially semicircular cross section. One end of the first insulator tooth portion 42-1 is formed continuously with an inner peripheral surface of the outer peripheral wall portion 41, that is, formed in such a manner as to project from the inner peripheral surface of the outer peripheral wall portion 41. The insulator tooth portions other than the first insulator tooth portion 42-1 among the plurality of insulator tooth portions 42-1 to 42-9, are also formed in a straight pillar shape, and are formed in such a manner as to protrude from the inner peripheral surface of the outer peripheral wall portion 41 similarly to the first insulator tooth portion 42-1. The plurality of insulator tooth portions 42-1 to 42-9 are arranged at equal intervals of 40 degrees on the inner peripheral surface of the outer peripheral wall portion 41.

The plurality of flange portions 43-1 to 43-9 correspond to the plurality of insulator tooth portions 42-1 to 42-9, and each has a substantially semicircular plate shape. A first flange portion 43-1, which corresponds to the first insulator tooth portion 42-1, of the plurality of flange portions 43-1 to 43-9, is formed continuously with the other end of the first insulator tooth portion 42-1. The flange portions other than the first flange portion 43-1 among the plurality of flange portions 43-1 to 43-9, are also formed continuously with the other ends of the plurality of insulator tooth portions 42-1 to 42-9 similarly to the first flange portion 43-1.

The upper insulator 24 is also formed in a manner similar to the lower insulator 25. That is, the upper insulator 24 is formed of an insulator, and includes an outer peripheral wall portion 41, a plurality of insulator tooth portions 42-1 to 42-9, and a plurality of flange portions 43-1 to 43-9.

Figure 5:
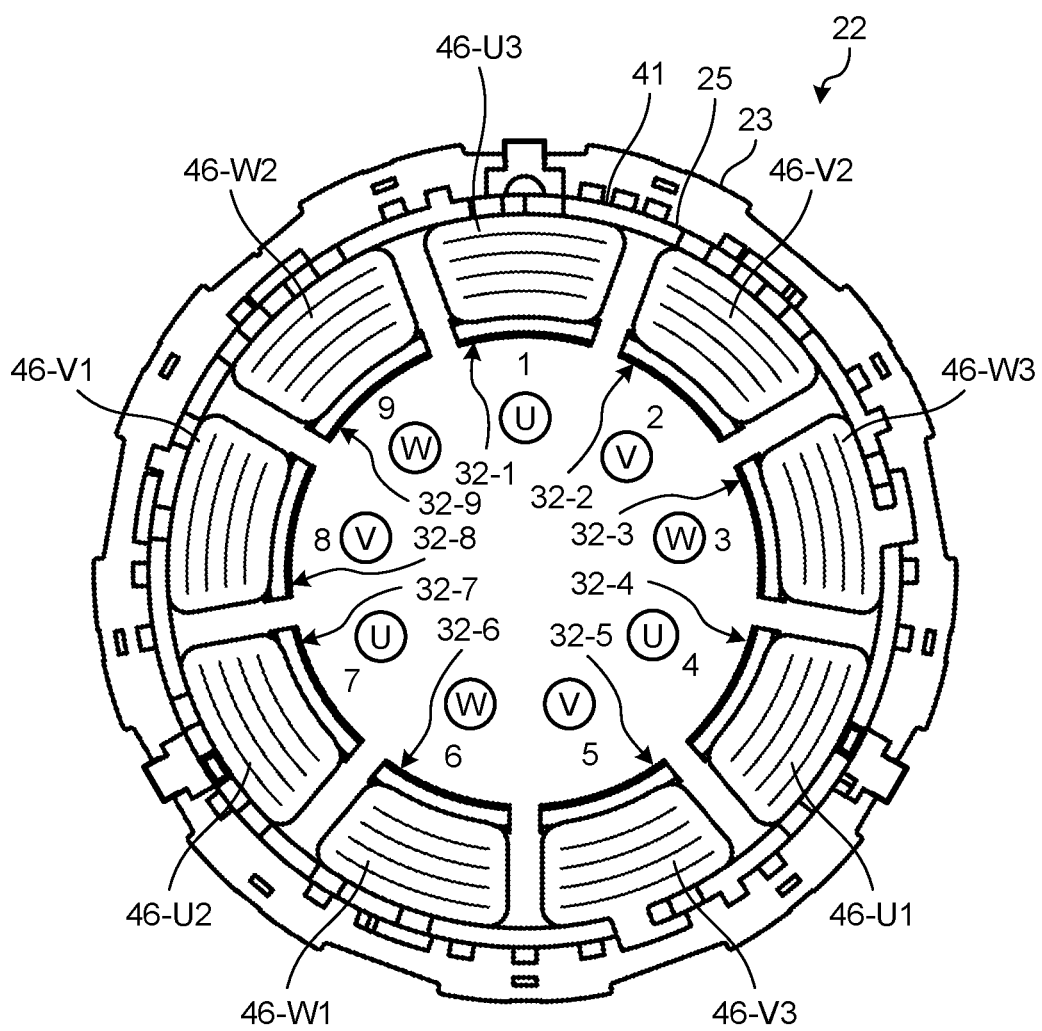
FIG. 5 is a bottom view illustrating a stator in the embodiment.

FIG. 5 is a bottom view illustrating the stator 22 in the embodiment. As illustrated in FIG. 5, a plurality of winding wires 46 is respectively wound around the plurality of stator core tooth portions 32-1 to 32-9 of the stator core 23. A winding portion 45 is formed by each of the winding wires 46 in each of the stator core tooth portions 32-1 to 32-9. The three-phase motor in the embodiment is a concentrated winding-type motor with six poles and nine slots (see FIG. 2). The plurality of winding wires 46 includes a plurality of U-phase winding wires 46-U1 to 46-U3, a plurality of V-phase winding wires 46-V1 to 46-V3, and a plurality of W-phase winding wires 46-W1 to 46-W3.

The U-phase winding wires have a plurality of winding wires. More specifically, a first U-phase winding wire 46-U1, a second U-phase winding wire 46-U2, and a third U-phase winding wire 46-U3 are included as the U-phase winding wires. The first U-phase winding wire 46-U1 is wound around a fourth stator core tooth portion 32-4. The second U-phase winding wire 46-U2 is wound around a seventh stator core tooth portion 32-7. The third U-phase winding wire 46-U3 is wound around the first stator core tooth portion 32-1.

The V-phase winding wires have a plurality of winding wires. More specifically, a first V-phase winding wire 46-V1, a second V-phase winding wire 46-V2, and a third V-phase winding wire 46-V3 are included as the V-phase winding wires. The first V-phase winding wire 46-V1 is wound around an eighth stator core tooth portion 32-8. The second V-phase winding wire 46-V2 is wound around a second stator core tooth portion 32-2. The third V-phase winding wire 46-V3 is wound around a fifth stator core tooth portion 32-5.

The W-phase winding wires have a plurality of winding wires. More specifically, a first W-phase winding wire 46-W1, a second W-phase winding wire 46-W2, and a third W-phase winding wire 46-W3 are included as the W-phase winding wires. The first W-phase winding wire 46-W1 is wound around a sixth stator core tooth portion 32-6. The second W-phase winding wire 46-W2 is wound around a ninth stator core tooth portion 32-9. The third W-phase winding wire 46-W3 is wound around a third stator core tooth portion 32-3.

The third U-phase winding wire 46-U3 is wound around the first stator core tooth portion 32-1 with the first insulator tooth portion 42-1 of the lower insulator 25, the first insulator tooth portion of the upper insulator 24, and an insulating film (not illustrated) arranged between the insulators 24 and 25. Thus, the third U-phase winding wire 46-U3 is properly insulated from the first stator core tooth portion 32-1 by the upper insulator 24 and the lower insulator 25, and is properly insulated from the stator core 23. Furthermore, the third U-phase winding wire 46-U3 is wound in such a manner as to be sandwiched between the first flange portion 43-1 and the outer peripheral wall portion 41 of the lower insulator 25, and is wound in such a manner as to be sandwiched between a first flange portion and the outer peripheral wall portion of the upper insulator 24. Thus, so-called winding failure in which the third U-phase winding wire 46-U3 comes off from the first stator core tooth portion 32-1 toward a side of the rotor 21, is prevented by the upper insulator 24 and the lower insulator 25.

The winding wires other than the third U-phase winding wire 46-U3 among the plurality of winding wires 46, are also properly insulated from the stator core 23 by the upper insulator 24 and the lower insulator 25, and winding failure is prevented.

Figure 6:
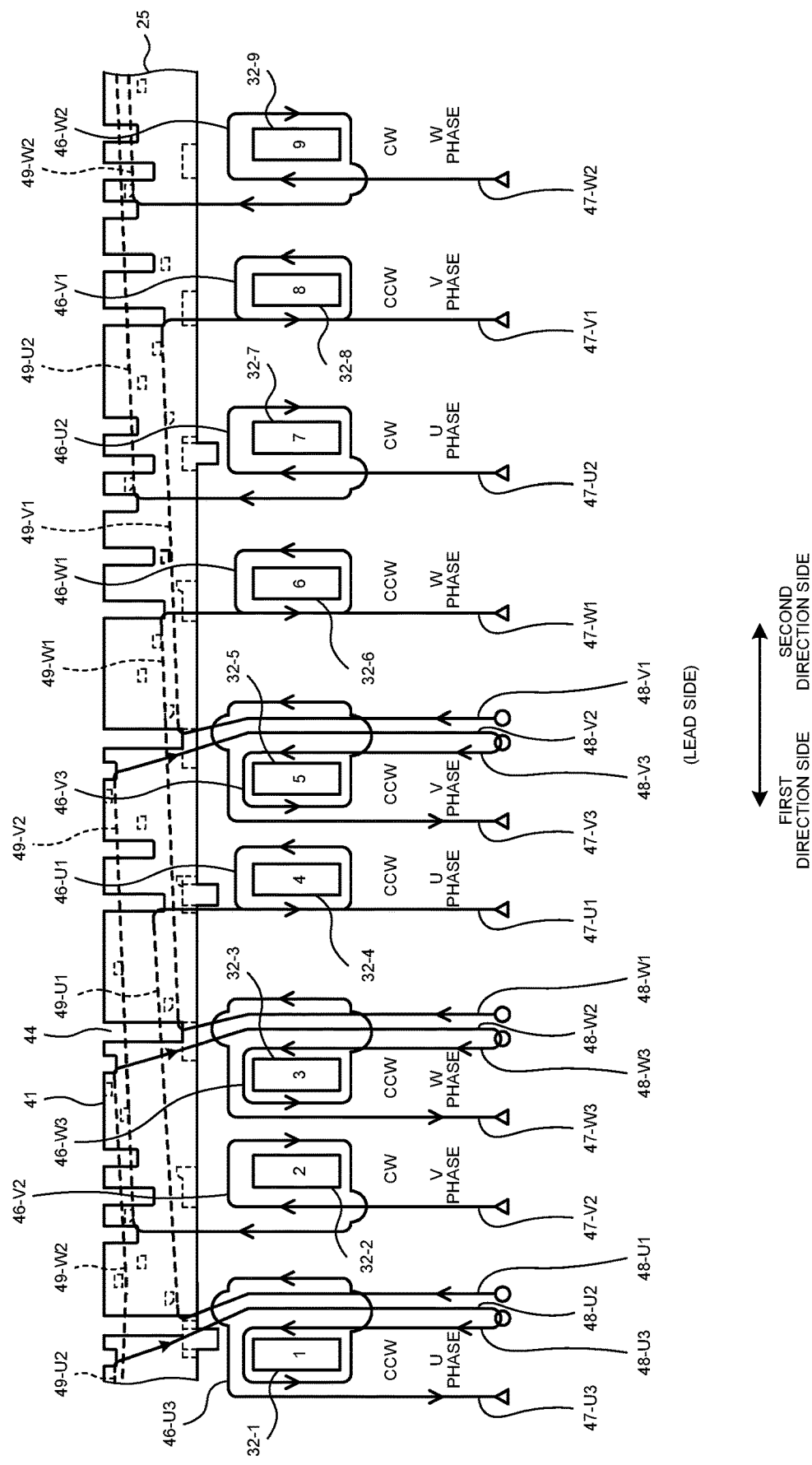
FIG. 6 is a development diagram illustrating a plurality of winding wires in the embodiment.

FIG. 6 is a development diagram illustrating the plurality of winding wires 46 in the embodiment. As illustrated in FIG. 6, the first U-phase winding wire 46-U1 is wound counterclockwise around the fourth stator core tooth portion 32-4. The second U-phase winding wire 46-U2 is wound clockwise around the seventh stator core tooth portion 32-7. The third U-phase winding wire 46-U3 is wound counterclockwise around the first stator core tooth portion 32-1. The first V-phase winding wire 46-V1 is wound counterclockwise around the eighth stator core tooth portion 32-8. The second V-phase winding wire 46-V2 is wound clockwise around the second stator core tooth portion 32-2. The third V-phase winding wire 46-V3 is wound counterclockwise around the fifth stator core tooth portion 32-5. The first W-phase winding wire 46-W1 is wound counterclockwise around the sixth stator core tooth portion 32-6. The second W-phase winding wire 46-W2 is wound clockwise around the ninth stator core tooth portion 32-9. The third W-phase winding wire 46-W3 is wound counterclockwise around the third stator core tooth portion 32-3.

The stator 22 further includes a plurality of U-phase neutral wires 47-U1 to 47-U3, a plurality of V-phase neutral wires 47-V1 to 47-V3, and a plurality of W-phase neutral wires 47-W1 to 47-W3. The plurality of U-phase neutral wires 47-U1 to 47-U3, the plurality of V-phase neutral wires 47-V1 to 47-V3, and the plurality of W-phase neutral wires 47-W1 to 47-W3, are arranged on a side of the upper insulator 24 that is farther from the lower insulator 25 than the plurality of stator core tooth portions 32-1 to 32-9. Note that since a side of a lead, which is a power wire, is also arranged on the side of the upper insulator 24, the side of the upper insulator 24 is also referred to as a lead side in the present description.

One end of a first U-phase neutral, wire 47-U1 is electrically connected to the first U-phase winding wire 46-U1. The one end of the first U-phase neutral wire 47-U1 is arranged on a first direction side of the fourth stator core tooth portion 32-4 (left side in FIG. 6), and the other end thereof is arranged on the lead side that is far from the lower insulator 25 compared to the fourth stator core tooth portion 32-4. One end of a second U-phase neutral wire 47-U2 is electrically connected to the second U-phase winding wire 46-U2. The one end of the second U-phase neutral wire 47-U2 is arranged or, the first direction side of the seventh stator core tooth portion 32-7, and the other end thereof is arranged on the lead side compared to the seventh stator core tooth portion 32-7. One end of a third U-phase neutral wire 47-U3 is electrically connected to the third U-phase winding wire 46-U3. The one end of the third U-phase neutral wire 47-U3 is arranged on the first direction side of the first stator core tooth portion 32-1, and the other end thereof is arranged on the lead side compared to the first stator core tooth portion 32-1.

The plurality of V-phase neutral wires 47-V1 to 47-V3 include a first V-phase neutral wire 47-V1, a second V-phase neutral wire 47-V2, and a third V-phase neutral wire 47-V3. One end of the first V-phase neutral wire 47-V1 is electrically connected to the first V-phase winding wire 46-V1. The one end of the first V-phase neutral wire 47-V1 is arranged on the first direction side of the fifth stator core tooth portion 32-5, and the other end thereof is arranged on the lead side compared to the fifth stator core tooth portion 32-5. One end of the second V-phase neutral wire 47-V2 is electrically connected to the second V-phase winding wire 46-V2. The one end of the second V-phase neutral wire 47-V2 is arranged on the first direction side of the second stator core tooth portion 32-2, and the other end thereof is arranged on the lead side compared to the second stator core tooth portion 32-2. One end of the third V-phase neutral wire 47-V3 is electrically connected to the third V-phase winding wire 46-V3. The one end of the third V-phase neutral wire 47-V3 is arranged on the first direction side of the fifth stator core tooth portion 32-5, and the other end thereof is arranged on the lead side compared to the fifth stator core tooth portion 32-5.

The plurality of W-phase neutral wires 47-W1 to 47-W3 include a first W-phase neutral wire 47-W1, a second W-phase neutral wire 47-W2, and a third W-phase neutral wire 47-W3. One end of the first W-phase neutral wire 47-W1 is electrically connected to the first W-phase winding wire 46-W1. The one end of the first W-phase neutral wire 47-W1 is arranged on the first direction side of the sixth stator core tooth portion 32-6, and the other end thereof is arranged on the lead side compared to the sixth stator core tooth portion 32-6. One end of the second W-phase neutral wire 47-W2 is electrically connected to the second W-phase winding wire 46-W2. The one end of the second W-phase neutral wire 47-W2 is arranged on the first direction side of the ninth stator core tooth portion 32-9, and the other end thereof is arranged on the lead side compared to the ninth stator core tooth portion 32-9. One end of the third W-phase neutral wire 47-W3 is electrically connected to the third W-phase winding wire 46-W3. The one end of the third W-phase neutral wire 47-W3 is arranged on the first direction side of the third stator core tooth portion 32-3, and the other end thereof is arranged on the lead side compared to the third stator core tooth portion 32-3.

The stator 22 further includes a plurality of U-phase power wires 48-U1 to 48-U3, a plurality of V-phase power wires 48-V1 to 48-V3, and a plurality of W-phase power wires 48-W1 to 48-W3.

One ends of the plurality of U-phase power wires 48-U1 to 48-U3 are arranged on the lead side of the first stator core tooth portion 32-1, and the one ends are arranged on a second direction side of the first stator core tooth portion 32-1 (right side in FIG. 6). The other end of a first U-phase power wire 48-U1 is electrically connected to the first U-phase winding wire 46-U1. The other end of a second U-phase power wire 48-U2 is electrically connected to the second U-phase winding wire 46-U2. The other end of a third U-phase power wire 48-U3 is electrically connected to the third U-phase winding wire 46-U3.

A part of the first U-phase power wire 48-U1 further passes through a plurality of slits 44 in the outer peripheral wall portion 41 of the lower insulator 25, and includes a first U-phase connecting wire portion 49-U1. The first U-phase connecting wire portion 49-U1 that is a part of the first U-phase power wire 48-U1, is arranged along an outer peripheral surface of the outer peripheral wall portion 41 of the lower insulator 25. A part of the second U-phase power wire 48-U2 further passes through a plurality of slits 44 in the outer peripheral wall portion 41 of the lower insulator 25, and includes a second U-phase connecting wire portion 49-U2. The second U-phase connecting wire portion 49-U2 that is a part of the second U-phase power wire 48-U2, is arranged along the outer peripheral surface of the outer peripheral wall portion 41 of the lower insulator 25.

One ends of the plurality of V-phase power wires 48-V1 to 48-V3 are arranged on the lead side of the fifth stator core tooth portion 32-5, and the one ends are arranged on the second direction side of the fifth stator core tooth portion 32-5. The other end of a first V-phase power wire 48-V1 is electrically connected to the first V-phase winding wire 46-V1. The other end of a second V-phase power wire 48-V2 is electrically connected to the second V-phase winding wire 46-V2. The other end of a third V-phase power wire 48-V3 is electrically connected to the third V-phase winding wire 46-V3.

A part of the first. V-phase power wire 48-V1 further passes through a plurality of slits 44 in the outer peripheral wall portion 41 of the lower insulator 25, and includes a first V-phase connecting wire portion 49-V1. The first V-phase connecting wire portion 49-V1 that is a part of the first V-phase power wire 48-V1, is arranged along the outer peripheral surface of the outer peripheral wall portion 41 of the lower insulator 25. A part of the second V-phase power wire 48-V2 further passes through a plurality of slits 44 in the outer peripheral wall portion 41 of the lower insulator 25, and includes a second V-phase connecting wire portion 49-V2. The second V-phase connecting wire portion 49-V2 that is a part of the second V-phase power wire 48-V2, is arranged along the outer peripheral surface of the outer peripheral wall portion 41 of the lower insulator 25.

One ends of the plurality of W-phase power wires 48-W1 to 48-W3, are arranged on the lead side of the third stator core tooth portion 32-3, and the one ends thereof are arranged on the second direction side of the third stator core tooth portion 32-3. The other end of a first W-phase power wire 48-W1 is electrically connected to the first W-phase winding wire 46-W1. The other end of a second W-phase power wire 48-W2 is electrically connected to the second W-phase winding wire 46-W2. The other end of a third W-phase power wire 48-W3 is electrically connected to the third W-phase winding wire 46-W3.

A part of the first W-phase power wire 48-W1 further passes through a plurality of slits 44 in the outer peripheral wall portion 41 of the lower insulator 25, and includes a first W-phase connecting wire portion 49-W1. The first W-phase connecting wire portion 49-W1 that is a part of the first W-phase power wire 48-W1, is arranged along the outer peripheral surface of the outer peripheral wall portion 41 of the lower insulator 25. A part of the second W-phase power wire 48-W2 further passes through a plurality of slits 44 in the outer peripheral wall portion 41 of the lower insulator 25, and includes a second W-phase connecting wire portion 49-W2. The second W-phase connecting wire portion 49-W2 that is a part of the second W-phase power wire 48-W2, is arranged along the outer peripheral, surface of the outer peripheral wall portion 41 of the lower insulator 25.

Figure 7:
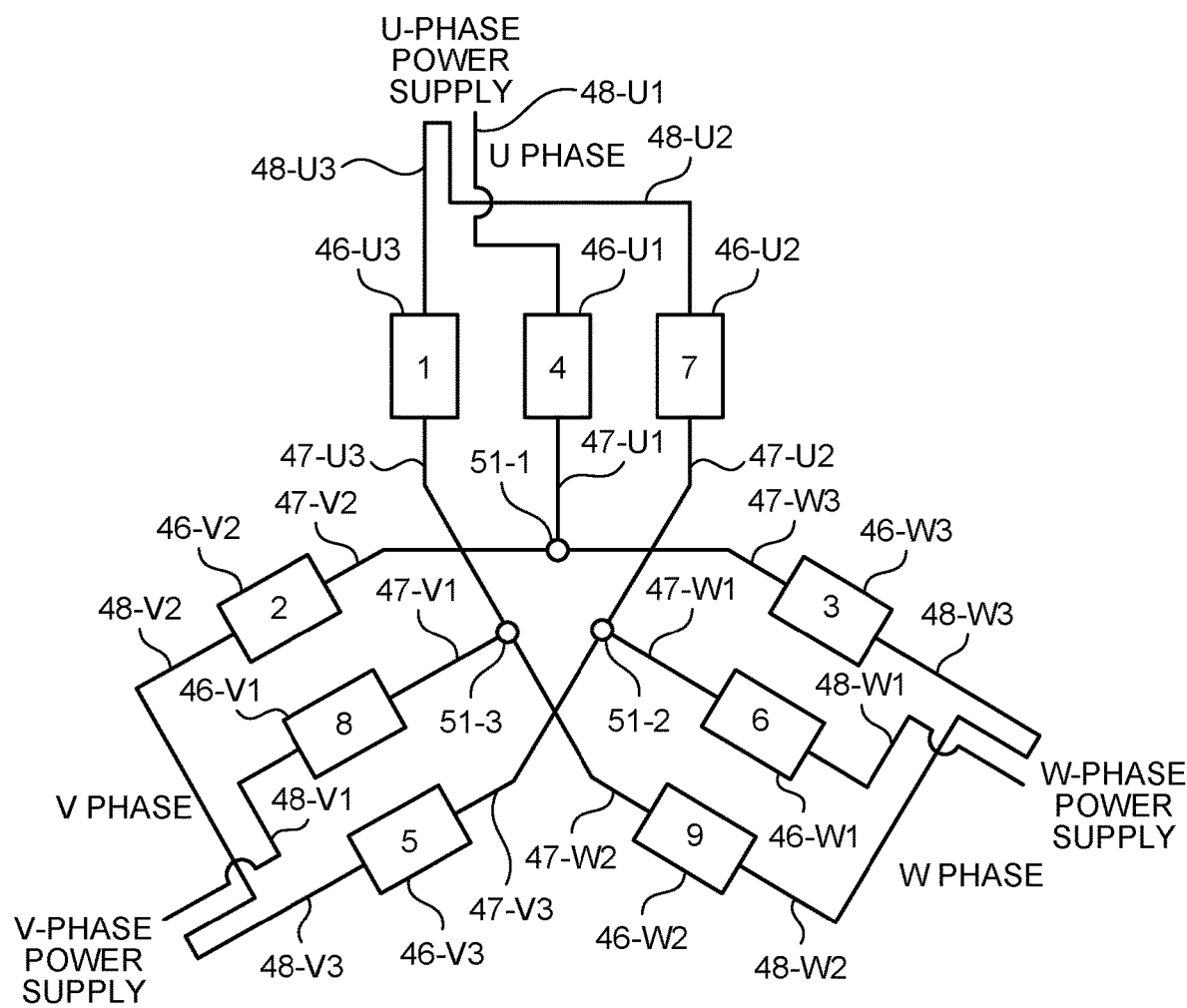
FIG. 7 is a connection wiring diagram illustrating a connection state of the plurality of winding wires in the embodiment.

FIG. 7 is a connection wiring diagram illustrating a connection state of the plurality of winding wires 46 in the embodiment. The three-phase motor in the embodiment is a motor having a star connection, in which the winding wires 46 are connected in parallel. The stator 22 further includes a plurality of neutral points as illustrated in FIG. 7. The plurality of neutral points is arranged on the lead side of the plurality of stator core tooth portions 32-1 to 32-9, and includes a first neutral point 51-1, a second neutral point 51-2, and a third neutral point 51-3. The first neutral point 51-1, the second neutral point 51-2, and the third neutral point 51-3 are electrically insulated from each other.

One end of the first U-phase winding wire 46-U1 is electrically connected to the first neutral point 51-1 via the first U-phase neutral wire 47-U1, and the other end thereof is electrically connected to a U-phase power supply via the first U-phase power wire 48-U1. One end of the second U-phase winding wire 46-U2 is electrically connected to the second neutral point 51-2 via the second U-phase neutral wire 47-U2, and the other end thereof is electrically connected to the U-phase power supply via the second U-phase power wire 48-U2. One end of the third U phase winding wire 46-U3 is electrically connected to the third neutral point 51-3 via the third U-phase neutral wire 47-U3, and the other end thereof is electrically connected to the U-phase power supply via the third U-phase power wire 48-U3.

One end of the first V-phase winding wire 46-V1 is electrically connected to the third neutral point 51-3 via the first V-phase neutral wire 47-V1, and the other end thereof is electrically connected to a V-phase power supply via the first V-phase power wire 48-V1. One end of the second V-phase winding wire 46-V2 is electrically connected to the first neutral point 51-1 via the second V-phase neutral wire 47-V2, and the other end thereof is electrically connected to the V-phase power supply via the second V-phase power wire 48-V2. One end of the third V-phase winding wire 46-V3 is electrically connected to the second neutral point 51-2 via the third V-phase neutral wire 47-V3, and the other end thereof is electrically connected to the V-phase power supply via the third V-phase power wire 48-V3.

One end of the first W-phase winding wire 46-W1 is electrically connected to the second neutral point 51-2 via the first W-phase neutral wire 47-W1, and the other end thereof is electrically connected to a W-phase power supply via the first W-phase power wire 48-W1. One end of the second W-phase winding wire 46-W2 is electrically connected to the third neutral point 51-3 via the second W-phase neutral wire 47-W2, and the other end thereof is electrically connected to the W-phase power supply via the second W-phase power wire 48-W2. One end of the third W-phase winding wire 46-W3 is electrically connected to the first neutral point 51-1 via the third W-phase neutral wire 47-W3, and the other end thereof is electrically connected to the W-phase power supply via the third W-phase power wire 48-W3.

[Manufacturing Method of Stator]

U-phase electric wires, V-phase electric wires, and W-phase electric wires are properly arranged, by a winding machine, in the stator core 23 on which the upper insulator 24 and the lower insulator 25 are properly mounted, whereby the stator 22 is manufactured. An electric wire is, for example, an enamel wire (electric wire that is a copper wire coated with an enamel coat). The winding machine includes, for example, a nozzle for a U-phase electric wire, a nozzle for a V-phase electric wire, and a nozzle for a W-phase electric, wire. The nozzle for a U-phase electric wire, the nozzle for a V-phase electric wire, and the nozzle for a W-phase electric wire are fixed to each other. When the nozzle for a U-phase electric wire is properly moved, a U-phase electric wire can be arranged in a predetermined position of the stator core 23. When the nozzle for a V-phase electric wire is properly moved, a V-phase electric wire can be arranged in a predetermined position of the stator core 23. When the nozzle for a W-phase electric wire is properly moved, a W-phase electric wire can be arranged in a predetermined position of the stator core 23. Note that the winding machine is not limited to a configuration of the present embodiment, and what includes only one nozzle may be used.

First, the stator core 23, to which the upper insulator 24, the lower insulator 25, and an insulating film (not illustrated) are properly mounted, is set in the winding machine. By moving the nozzle for a U-phase electric wire properly, the winding machine arranges one end of a U-phase electric wire on a lead side of the first stator core tooth portion 32-1, and causes the U-phase electric wire to pass through one of the plurality of slit 44 along a second direction side of the first stator core tooth portion 32-1. Then, by moving the nozzle for a U-phase electric wire properly and arranging the U-phase electric wire along an outer peripheral surface of the outer peripheral wall portion 41 of the lower insulator 25 the winding machine forms a first U-phase connecting wire portion 49-U1 from the U-phase electric wire. By further moving the nozzle for a U-phase electric wire properly and arranging the U-phase electric wire from the one of the plurality of slits 44 to the fourth stator core tooth portion 32-4, the winding machine forms a first U-phase power wire 48-U1 from the U-phase electric wire. At this time, the winding machine forms a first V-phase power wire 48-V1 from a V-phase electric wire, and forms a first W-phase power wire 48-W1 from a W-phase electric wire by moving the nozzle for a V-phase electric wire and the nozzle for a W-phase electric wire in synchronization with the nozzle for a U-phase electric wire.

Next, by moving the nozzle for a U-phase electric wire properly and winding the U-phase electric wire counterclockwise around the fourth stator core tooth portion 32-4, the winding machine forms a first U-phase winding wire 46-U1 from the U-phase electric wire. At this time, by moving the nozzle for a v-phase electric wire in synchronization with the nozzle for a U-phase electric wire, the winding machine winds the V-phase electric wire counterclockwise around the eighth stator core tooth portion 32-8, and forms a first V-phase winding wire 46-V1 from the V-phase electric wire. By moving the nozzle for a W-phase electric wire in synchronization with the nozzle for a U-phase electric wire, the winding machine winds the W-phase electric wire counterclockwise around the sixth stator core tooth portion 32-6, and forms a first W-phase winding wire 46-W1 from the W-phase electric wire.

Next, by moving the nozzle for a U-phase electric wire properly and arranging the U-phase electric wire from a first direction side of the fourth stator core tooth portion 32-4 to the lead side of the fourth stator core tooth portion 32-4, the winding machine forms a first U-phase neutral wire 47-U1 from the U-phase electric wire. At this time, the winding machine forms a first V-phase neutral wire 47-V1 from the V-phase electric wire, and forms a first W-phase neutral wire 47-W1 from the W-phase electric wire by moving the nozzle for a V-phase electric wire and the nozzle for a W-phase electric wire in synchronization with the nozzle for a U-phase electric wire.

Next, by moving the nozzle for a U-phase electric wire properly and arranging the U-phase electric wire from the lead side of the seventh stator core tooth portion 32-7 to the first direction side of the seventh stator core tooth portion 32-7, the winding machine forms a second U-phase neutral wire 47-U2 from the U-phase electric wire. At this time, the winding machine forms a second V-phase neutral wire 47-V2 from the V-phase electric wire, and forms a second W-phase neutral wire 47-W2 from the W-phase electric wire by moving the nozzle for a V-phase electric wire and the nozzle for a W-phase electric wire in synchronization with the nozzle for a U-phase electric wire.

Next, by moving the nozzle for a U-phase electric wire properly and winding the U-phase electric wire clockwise around the seventh stator core tooth portion 32-7, the winding machine forms a second U-phase winding wire 46-U2 from the U-phase electric wire. At this time, by moving the nozzle for a V-phase electric wire in synchronization with the nozzle for a U-phase electric wire, the winding machine winds the V-phase electric wire clockwise around the second stator core tooth portion 32-2, and forms a second V-phase winding wire 46-V2 from the V-phase electric wire. By moving the nozzle for a W-phase electric wire in synchronization with the nozzle for a U-phase electric wire, the winding machine winds the W-phase electric wire clockwise around the ninth stator core tooth portion 32-9, and forms a second W-phase winding wire 46-W2 from the W-phase electric wire.

Then, by moving the nozzle for a U-phase electric wire properly and causing the U-phase electric wire to be arranged along the outer peripheral surface of the outer peripheral wall portion 41 through one of the plurality of slits 44, the winding machine forms a second U-phase connecting wire portion 49-U2 from the U-phase electric wire. By further moving the nozzle for a U-phase electric wire properly and arranging the U-phase electric wire on the lead side of the first stator core tooth portion 32-1 through one of the plurality of slits 44, the winding machine forms a second U-phase power wire 48-U2 from the U-phase electric wire. At this time, the winding machine forms a second Y-phase power wire 48-V2 from the V-phase electric wire, and forms a second W-phase power wire 48-W2 from the W-phase electric wire by moving the nozzle for a V-phase electric wire and the nozzle for a W-phase electric wire in synchronization with the nozzle for a U-phase electric wire.

Next, by moving the nozzle for a U-phase electric wire properly and arranging the U-phase electric wire from the lead side of the first stator core tooth portion 32-1 to the second direction side of the first stator core tooth portion 32-1, the winding machine forms a third U-phase power wire 48-U3 from the U-phase electric wire. At this time, the winding machine forms a third V-phase power wire 48-V3 from the V-phase electric wire, and forms a third W-phase power wire 48-W3 from the W-phase electric wire by moving the nozzle for a V-phase electric wire and the nozzle for a W-phase electric wire in synchronization with the nozzle for a U-phase electric wire. Also, a first connection terminal 50-1 is connected to one end, at which the plurality of U-phase power wires 48-U1 to 48-U3 is bundled, a second connection terminal 50-2 is connected to one end, at which the plurality of V-phase power wires 48-V1 to 48-V3 is bundled, and a third connection terminal 50-3 is connected to one end, at which the plurality of W-phase power wires 48-W1 to 48-W3 is bundled (See FIG. 2).

Next, by moving the nozzle for a U-phase electric wire properly and winding the U-phase electric wire counterclockwise around the first stator core tooth portion 32-1, the winding machine forms a third U-phase winding wire 46-U3 from the U-phase electric wire. At this time, by moving the nozzle for a V-phase electric wire in synchronization with the nozzle for a U-phase electric wire, the winding machine winds the V-phase electric wire counterclockwise around the fifth stator core tooth portion 32-5, and forms a third V-phase winding wire 46-V3 from the V-phase electric wire. By moving the nozzle for a W-phase electric wire in synchronization with the nozzle for a U-phase electric wire, the winding machine winds the W-phase electric wire counterclockwise around the third stator core tooth portion 32-3, and forms a third W-phase winding wire 46-W3 from the W-phase electric wire.

Next, by moving the nozzle for a U-phase electric wire properly and arranging the U-phase electric wire from the first direction side of the first stator core tooth portion 32-1 to the lead side of the first stator core tooth portion 32-1, the winding machine forms a third U-phase neutral wire 47-U3 from the U-phase electric wire. At this time, the winding machine forms a third V-phase neutral wire 47-V3 from the V-phase electric wire, and forms a third W-phase neutral wire 47-W3 from the W-phase electric wire by moving the nozzle for a V-phase electric wire and the nozzle for a W-phase electric wire in synchronization with the nozzle for a U-phase electric wire.

By being wound in the above manner, both of a winding start portion and a winding end portion of the third U-phase winding wire 46-U3, are arranged on the lead side as illustrated in FIG. 6 and FIG. 7. On the one hand, winding of the first U-phase winding wire 46-U1 and the second U-phase winding wire 46-U2, is started from an opposite side of the lead, and the winding is ended on the lead side. Thus, the number of turns, in which the third U-phase winding wire 46-U3 is wound, is different from the number of turns, in which the first U-phase winding wire 46-U1 is wound, and from the number of turns, in which the second U-phase winding wire 46-U2 is wound. Also, the first U-phase winding wire 46-U1 and the second U-phase winding wire 46-U2 have different lengths, in which the U-phase power wire connected to the U-phase power supply is routed. In other words, ways of winding, which includes the number of turns of a winding wire and a length of a power wire, of the first U-phase winding wire 46-U1 to the third U-phase winding wire 46-U3, are different. Thus, a length of an electric wire from the neutral point 51-1 to the U-phase power wire, is different in the first U-phase winding wire 46-U1, the second U-phase winding wire 46-U2, and the third U-phase winding wire 46-U3, and impedance thereof is also different.

The first U-phase neutral wire 47-U1 and the second U-phase neutral wire 47-U2 are separated, the first V-phase neutral wire 47-V1 and the second V-phase neutral wire 47-V2 are separated, and the first W-phase neutral wire 47-W1 and the second W-phase neutral wire 47-W2 are separated. An end of the first U-phase neutral wire 47-01, an end of the second V-phase neutral wire 47-V2, and an end of the third W-phase neutral wire 47-W3, are electrically connected by a connector that can electrically connect a plurality of winding wires without peeling off coats of electric wires (hereinafter, referred to as connector).

Figure 8:
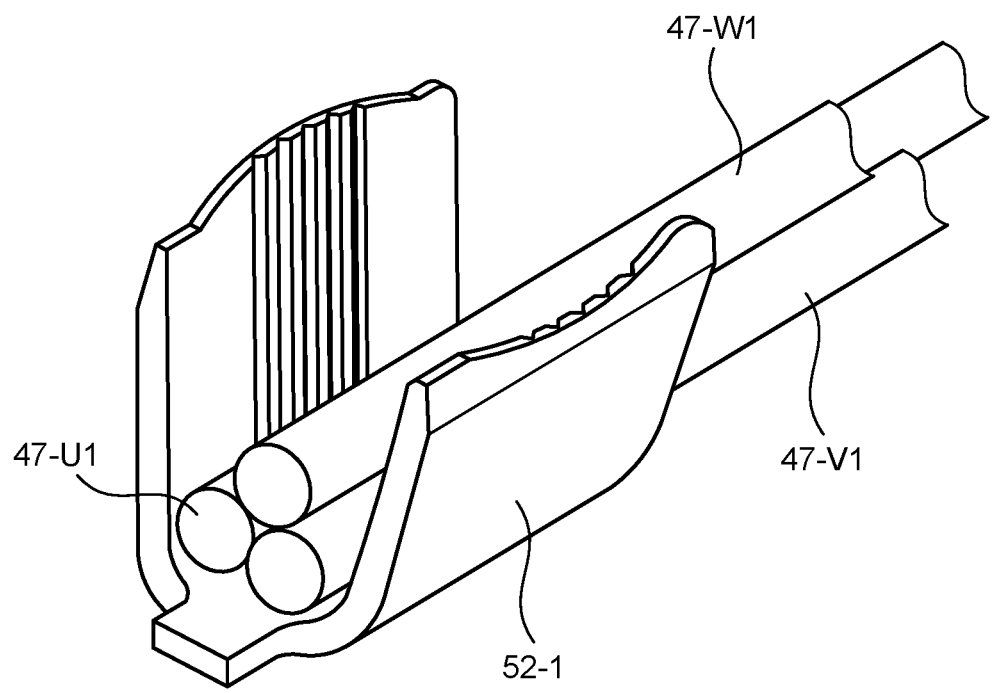
FIG. 8 is a perspective view illustrating a state before connection between a first splice terminal and an electric wire in the embodiment.

For example, a first splice terminal 52-1 in a manner illustrated in FIG. 8 is used as a connecting member. FIG. 8 is a perspective view illustrating a state before connection between the first splice terminal 52-1 and electric wires in the embodiment. In the present embodiment, an end of the first U-phase neutral wire 47-U1, an end of the second V-phase neutral wire 47-V2, and an end of the third W-phase neutral wire 47-W3, are electrically connected to each other by being joined to each other by crimping via the first splice terminal 52-1, whereby a first neutral point 51-1 is formed. As illustrated in FIG. 8, the three electric wires (neutral wire) are stably bundled in a state of being in contact with each other. The first splice terminal 52-1 as a connecting member can electrically connect the three electric wires to each other by performing joining thereof by crimping in such a manner as to wrap the bundled electric wires. When an electric wire group is crimped by the first splice terminal 52-1, a coating film of each electric wire is peeled off by an uneven portion of the first splice terminal 52-1, and the three electric wires are joined. Note that the number of electric wires bundled by the connecting member, is not limited to three. That is, as long as electric wires can be joined to each other by crimping and electrically connected to each other, the number of bundled wires is not limited.

Similarly, an end of the second U-phase neutral wire 47-U2, an end of the third V-phase neutral wire 47-V3, and an end of the first W-phase neutral wire 47-W1, are electrically connected to each other by being joined to each other by crimping via a second splice terminal 52-2, whereby a second neutral point 51-2 is formed. The end of the third U-phase neutral wire 47-U3, the end of the first V-phase neutral wire 47-V1, and the end of the second W-phase neutral wire 47-W2, are electrically connected to each other by being joined to each other by crimping by a third splice terminal 52-3, whereby a third neutral point 51-3 is formed. As a result, the first neutral point 51-1, the second neutral point 51-2, and the third neutral point 51-3, can be easily formed.

[Operation of Compressor]

The compressor 1 is provided as a component of a refrigeration cycle device (not illustrated), and is used to compress a refrigerant and circulate the refrigerant in a refrigerant circuit of the refrigeration cycle device. The three-phase motor 6 generates a rotating magnetic field when a three-phase voltage is applied to each of the plurality of U-phase power wires 48-U1 to 48-U3, the plurality of V-phase power wires 48-V1 to 48-V3, and the plurality of W-phase power wires 48-W1 to 48-W3. The rotor 21 is rotated by the rotating magnetic field generated by the stator 22. The three-phase motor 6 rotates the shaft 3 by the rotation of the rotor 21.

The compression unit 5 sucks low-pressure refrigerant gas through the suction pipe 11 by the rotation of the shaft 3, generates high-pressure refrigerant gas by compressing the sucked low-pressure refrigerant gas, and supplies the high-pressure refrigerant gas to the upper muffler chamber 16 and the lower muffler chamber 17. The lower muffler cover 15 reduces a pulsation of the pressure of the high-pressure refrigerant gas supplied to the lower muffler chamber 17, and supplies the high-pressure refrigerant gas with a reduced pressure pulsation to the upper muffler chamber 16. The upper muffler cover 14 reduces a pulsation of the pressure of the high-pressure refrigerant gas supplied to the upper muffler chamber 16, and supplies the high-pressure refrigerant gas with a reduced pressure pulsation to a space between the compression unit 5 and the three-phase motor 6 in the internal space 7 through the compressed refrigerant discharge hole 18.

The high-pressure refrigerant gas supplied to the space between the compression unit 5 and the three-phase motor 6 in the internal space 7, passes through a gap formed in the three-phase motor 6, and is supplied to a space above the three-phase motor 6 in the internal space 7. The refrigerant supplied to the space above the three-phase motor 6 in the internal space 7, is discharged through the discharge pipe 12 to a device arranged on a downstream side of the compressor 1 in the refrigeration cycle device.

[Characteristic Configuration of Compressor] Next, a characteristic configuration of the three-phase motor 6 in the embodiment will be described. As described above, the three U-phase neutral wires 47-U1 to 47-U3, the three V-phase neutral wires 47-V1 to 47-V3, and the three W-phase neutral wires 47-W1 to 47-W3 (hereinafter, also referred to as neutral wire 47), are respectively connected at the neutral points 51-1 to 51-3 (hereinafter, also referred to as neutral point 51). A characteristic of the present embodiment includes a mounting structure of the nine neutral wires 47 with respect to the stator 22.

The nine neutral wires 47 include three first fixation portions 56 fixed to the stator 22 in positions that are on a side of the winding portions 45 compared to each of the neutral points 51, and a second fixation portion 57 in which three sets of neutral wires 47 respectively connected at the three neutral points 51, are bundled from each of the first fixation portions 56 to each of the neutral points 51. A side of each of the neutral points 51 of the neutral wires 47 bundled by the second fixation portion 57, is inserted into a gap G between winding portions 45 adjacent in a circumferential direction of the stator 22 (rotational direction of the rotor 21) with the second fixation portion 57 being covered with an insulating tube 59 that is an insulating member (see FIG. 2).

[Main part of stator manufacturing process] A main part of a manufacturing process of the stator 22 of the three-phase motor 6, will be described. FIG. 9 is a flowchart for describing the manufacturing process of the stator 22 in the embodiment. As illustrated in FIG. 9, a winding process of the stator 22 is performed in the above manner (Step S1), whereby each winding wire 46 is formed. Each electric wire supplied from a side of each nozzle for an electric wire is cut (Step S2), whereby one end (neutral wire 47) of each winding wire 46 is separated from the side of each nozzle for an electric wire.

Subsequently, with one each of the U-phase, v-phase, and W-phase neutral wires 47 among the neutral wires 47 of the winding wires 46 being one set, the three neutral wires 47 are routed along an outer peripheral surface of the upper insulator 24, and the three neutral wires 47 are fixed to each other at one place in a circumferential direction of the upper insulator 24 (in the present embodiment, when the three neutral wires 47 are bundled, a root part of each of the neutral wires 47 becomes a twisted state and the three neutral wires 47 are fixed to each other) (Step S3). Thus, a first fixation portion 56, in which the three neutral wires 47 are fixed to the stator 22, is formed. In Step S3, with respect to nine neutral wires 47 respectively extended from nine winding portions 45, a first fixation portion 56 is formed with three neutral wires 47 as one set. Thus, three sets of neutral wires 47 are respectively fixed at three first fixation portions 56. Details of the forming process of the first fixation portions 56 will be described later.

Next, the three sets of neutral wires 47 respectively extended from the first fixation portions 56, are cut at a predetermined length (Step S4), whereby lengths of the three sets of neutral wires 47 from the first fixation portions 56, are made to be the same. Subsequently, the three sets of neutral wires 47 are respectively joined by crimping via the splice terminals 52 (52-1 to 52-3) (Step S5), whereby three neutral points 51 are formed. Subsequently, the three sets of neutral wires 47 are bundled, and the three sets of neutral wires 47 are fixed together (in the present embodiment, the three sets of neutral wires 47 are twisted together in a state of being bundled) (Step S6), whereby a second fixation portion 57, in which the three sets of neutral wires 47 are bundled, is formed. Details of the forming process of the second fixation portion 57 will be described later.

Next, the bundled neutral wires 47 are inserted into the insulating tube 58 (Step S7), whereby an insulation property of the entire neutral wires 47 extended from each of the winding portions 45 is secured. Finally, a side of each splice terminal 52 (each neutral point 51) of the neutral wires 47 covered with the insulating tube 58 is housed into a gap G between adjacent winding portions 45 (Step S8).

Figure 10A:
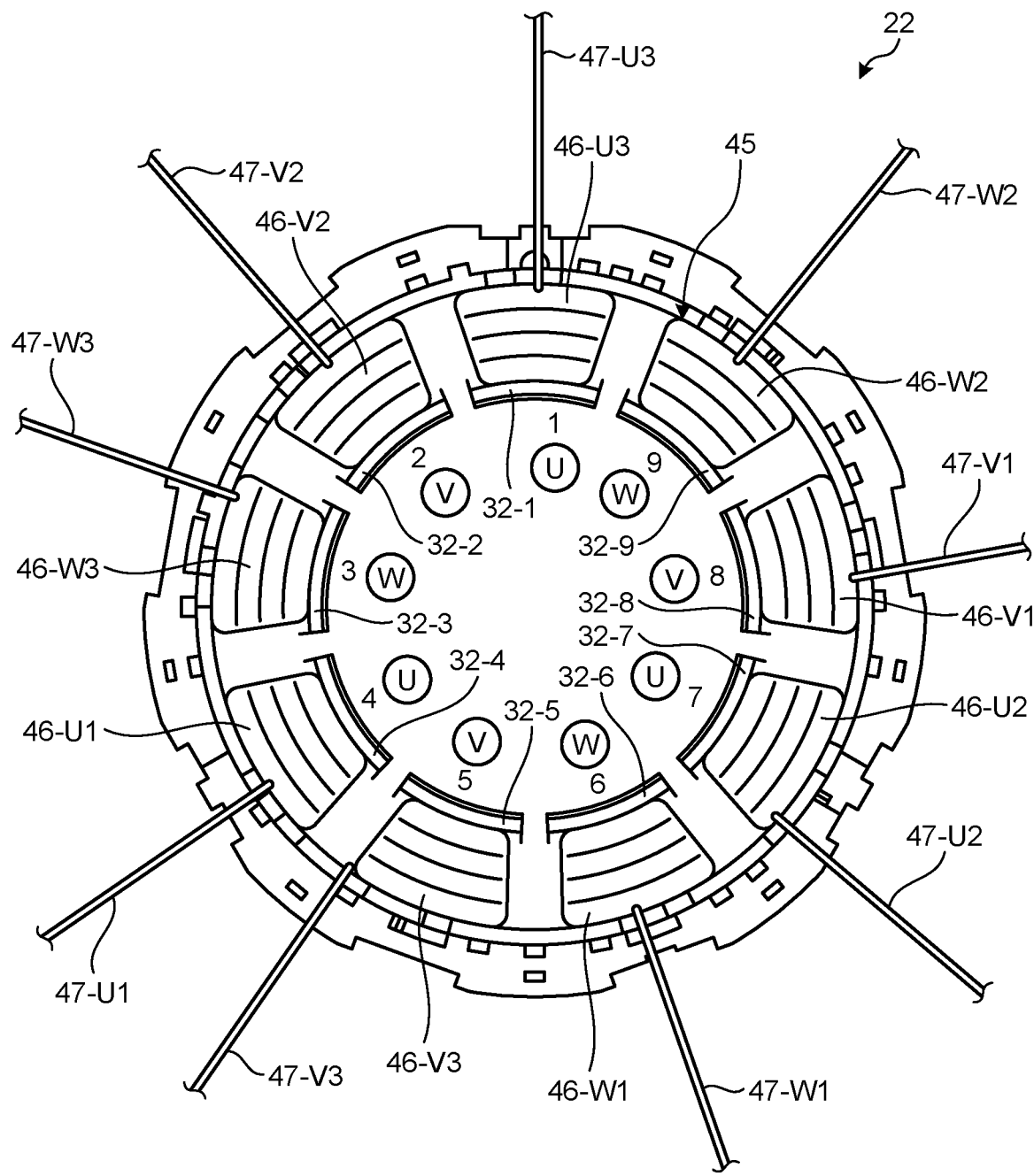
FIG. 10A is a plan view illustrating a state in which nine neutral wires are palled out in the embodiment.
Figure 10B:
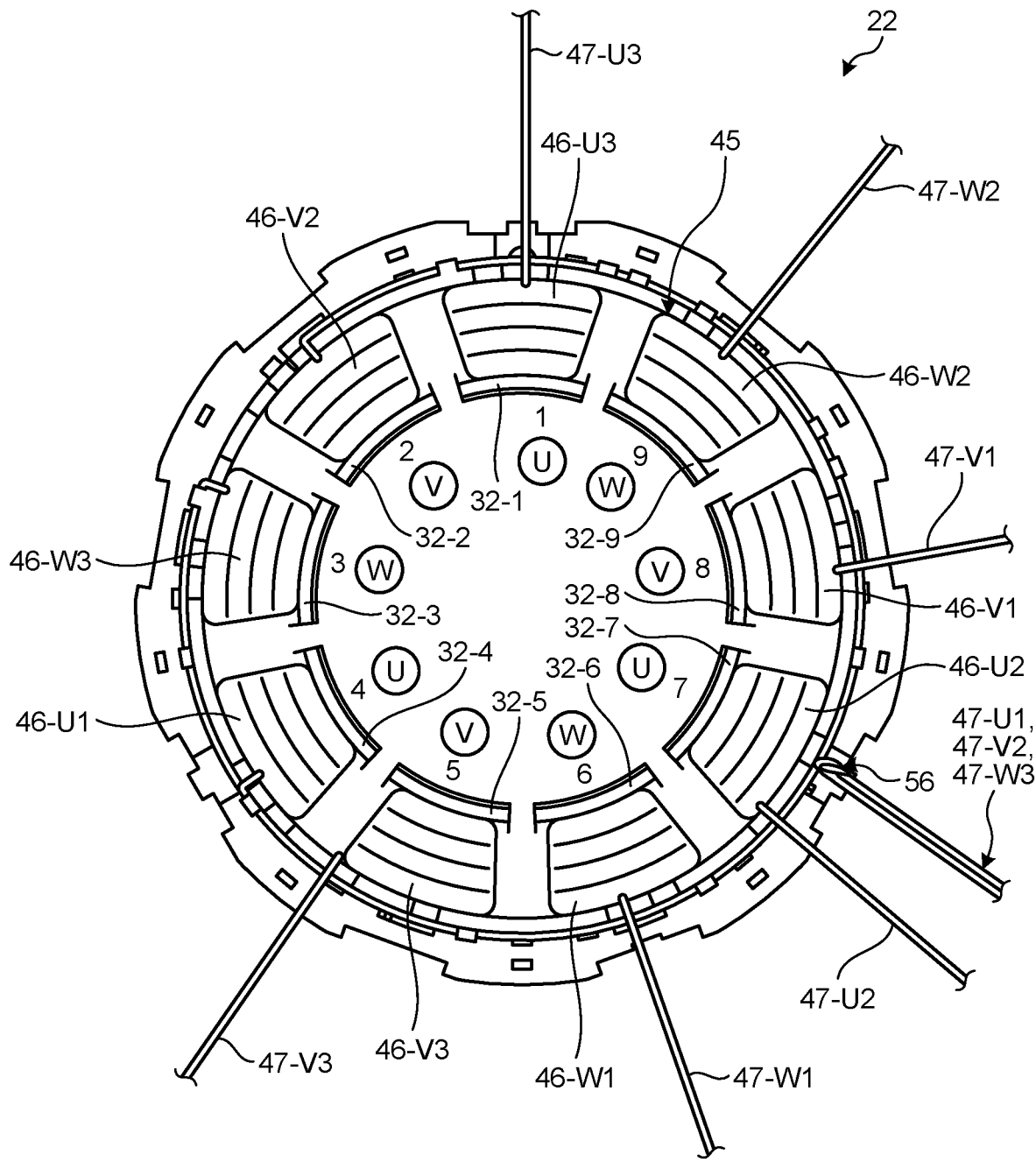
FIG. 10B is a plan view illustrating a state in which a first fixation portion is formed by three neutral wires among the nine neutral wires in the embodiment.
Figure 10D:
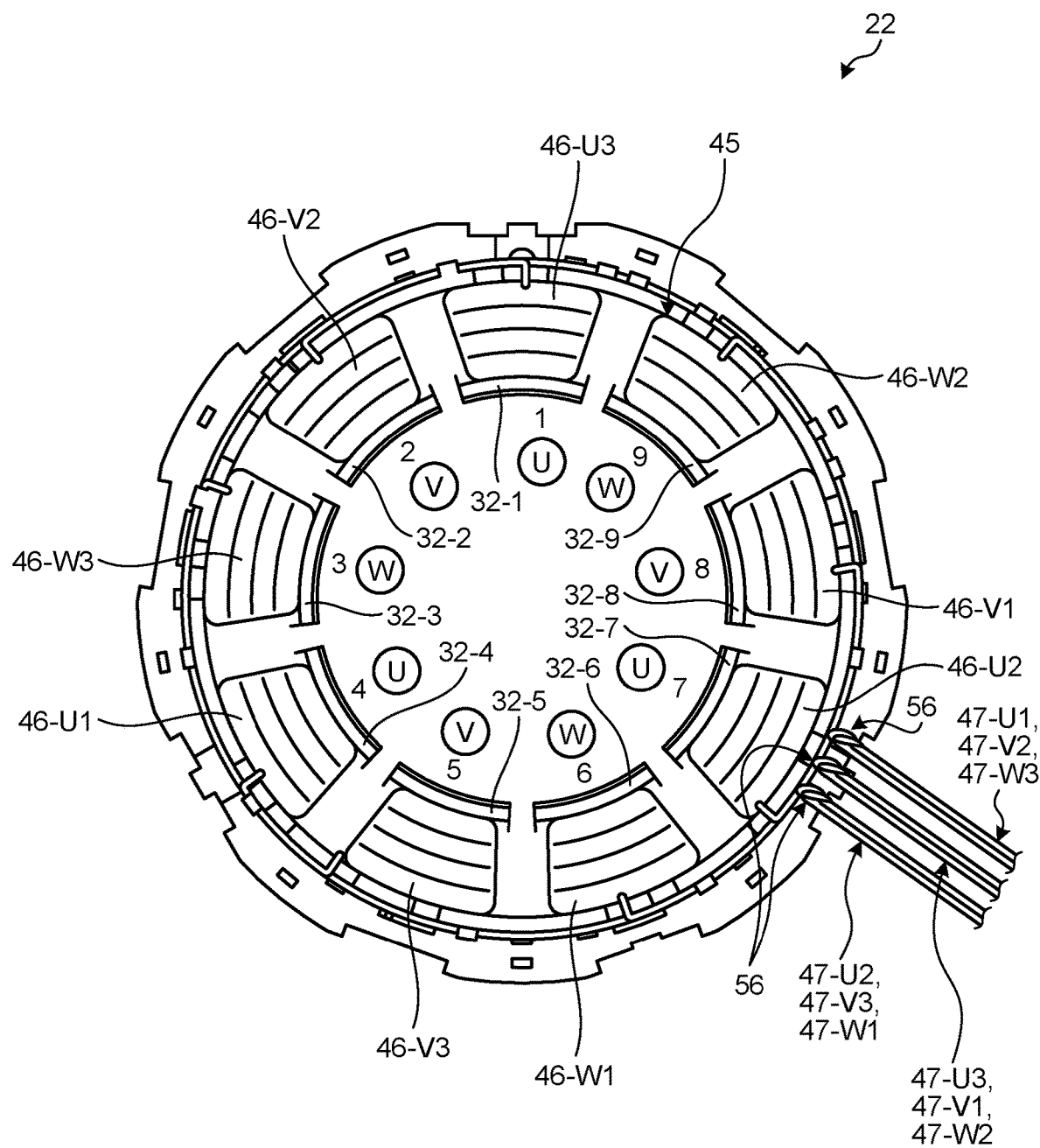
FIG. 10D is a plan view illustrating a state in which a first fixation portion is formed by the remaining three neutral wires in the embodiment.

[Forming Process of First Fixation Portion] FIG. 10A is a plan view illustrating a state in which nine neutral wires 47 are pulled out in the embodiment. FIG. 10B is a plan view illustrating a state in which a first fixation portion 56 is formed by three neutral wires 47 among the nine neutral wires 47 in the embodiment. FIG. 10C is a plan view illustrating a state in which a first fixation portion 56 is formed by three neutral wires 47 among the remaining six neutral wires 47 in the embodiment. FIG. 10D is a plan view illustrating a state in which a first fixation portion 56 is formed by the remaining three neutral wires 47 in the embodiment. FIG. 10A to FIG. 10D are top views of the stator 22 viewed from a side of the upper insulator 24. Winding portions 45 that are nine slots, are numbered as 1 to 9 in counterclockwise order.

As illustrated in FIG. 10A, nine neutral wires 47 that are three U-phase neutral wires 47-U1 to 47-U3, three V-phase neutral wires 47-V1 to 47-V3, and three W-phase neutral wires 47-W1 to 47-W3 are respectively pulled out from the winding portions 45 of the stator 22. First, as illustrated in FIG. 10A and FIG. 10B, a V-phase neutral wire 47-V2, a W-phase neutral wire 47-W3, and a U-phase neutral wire 47-U1, which are respectively pulled out from second, third, and fourth winding portions 45, among the nine neutral wires 47, are extended along the outer peripheral surface of the upper insulator 24 and twisted together, for example, in the vicinity of a seventh winding portion 45, whereby a first fixation portion 56, in which the three neutral wires 47 are in a state of being bundled with roots thereof being fixed, is formed. At this time, among the three neutral wires 47, the V-phase neutral wire 47-V2 is extended clockwise, the W-phase neutral wire 47-W3 and the U-phase neutral wire 47-U1 are extended counterclockwise, and the three neutral wires 47 are twisted together.

That is, a neutral wire 47 extended toward one side in the circumferential direction of the upper insulator 24, and a neutral wire 41 extended toward the other side in the circumferential direction of the upper insulator 24, are twisted together and fixed in the first fixation portion 56. For example, an amount of a twist of the three neutral wires 47 is preferably about three rotations. With a degree with which the three neutral wires 47 are temporarily fixed (provisionally fixed) in the circumferential direction of the upper insulator 24, fixing work is easily performed. By routing of the three neutral wires 47 in the above manner, the neutral wires 47 respectively extended to one side and the other side in the circumferential direction of the insulator 24, are formed in such a manner as to pull each other with the insulator 24 therebetween. Thus, tension is applied to the neutral wires 47 extended from the winding portions 45 to the first fixation portion 56, and fixation to the insulator 24 is realised. Note that a neutral wire 47 extended clockwise and a neutral wire 47 extended counterclockwise among the three neutral wires 47, are not limited to the above combination, and may be changed arbitrarily, for example, according to a position in which the first fixation portion 56 is formed in the circumferential direction of the upper insulator 24.

Subsequently, similarly to the first fixation portion 56, as illustrated in FIG. 10B and FIG. 10C, a V-phase neutral wire 47-V3, a W-phase neutral wire 47-W1, and a U-phase neutral wire 47-U2, which are respectively pulled out from fifth, sixth, and seventh winding portions 45, among the remaining six neutral wires 47, are extended along the outer peripheral surface of the upper insulator 24, and twisted together in the vicinity of the seventh winding portion 45, whereby a first fixation portion 56, in which the three neutral wires 47 are fixed, is formed. At this time, among the three neutral wires 47, the V-phase neutral wire 47-V3 is extended clockwise, the W-phase neutral wire 47-W1 and the U-phrase neutral wire 47-U2 are extended counterclockwise, and the three neutral wires 47 are twisted together.

Subsequently, similarly to the above-described first fixation portion 56, as illustrated in FIG. 10C and FIG. 10D, a V-phase neutral wire 47-V1, a W-phase neutral wire 47-W2, and a U-phase neutral wire 47-U3, which are respectively pulled out from eighth, ninth, and first winding portions 45, among the remaining three neutral wires 47, are extended along the outer peripheral surface of the upper insulator 24, and twisted together in the vicinity of the seventh winding portion 45, whereby a first fixation portion 56, in which the three neutral wires 47 are fixed, is formed. At this time, among the three neutral wires 47, the V-phase neutral wire 47-V1 and the W-phase neutral wire 47-W2 are extended clockwise, and the U-phase neutral wire 47-U3 is extended counterclockwise, and the three neutral wires 47 are twisted together.

As illustrated in FIG. 10D, with respect to the nine neutral wires 47, three sets of neutral wires 47 are respectively pulled out from the three first fixation portions 56 with three neutral wires 47 as one set. The three first fixation portions 56 are arranged in vicinity of each other in the circumferential direction of the stator 22, whereby work of twisting the three sets of neutral wires 47 together (described later) can be easily performed. Note that as described above, a configuration in which three neutral wires 47 are routed as a set in the above manner, is not a limitation, and at least two neutral wires 47 are routed in opposite directions (clockwise and counterclockwise directions) according to a structure of a motor.

Since the stator 22 has the first fixation portions 56, the nine neutral wires 47 can be fixed to the upper insulator 24. Thus, for example, it is possible to prevent movement of the neutral wires 47 extended along the outer peripheral surface of the insulator 24 in an assembling work. In addition, since the stator 22 has the first fixation portions 56, roots of three neutral wires 47 connected at a neutral point 51 are fixed. Thus, it becomes possible to easily perform a work of connecting the three neutral wires 47 as one set at the neutral point 51.

[Forming Process of Second Fixation Portion]

Figure 11B:
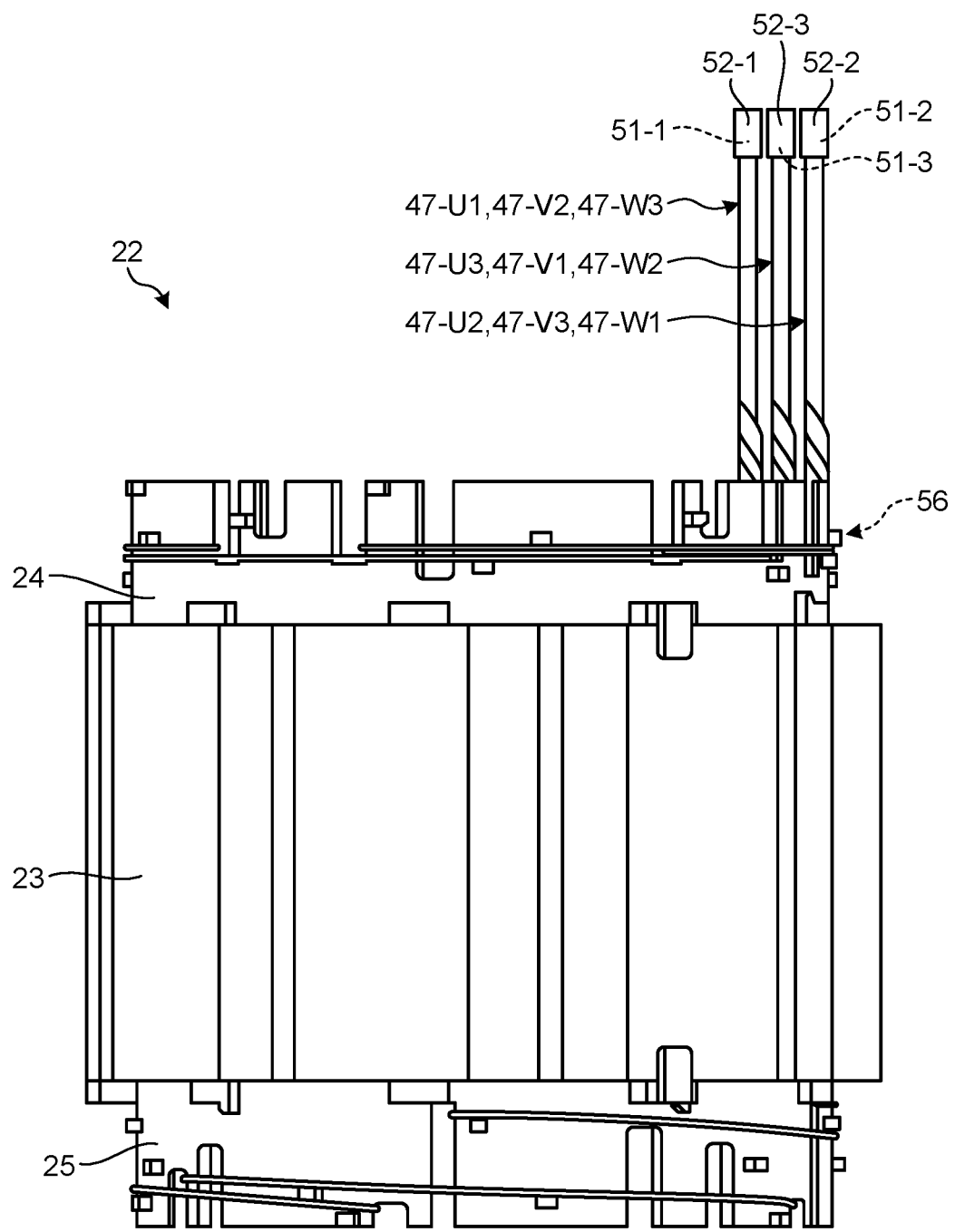
FIG. 11B is a side view illustrating a state in which each of the three sets of neutral wires is joined by crimping in the embodiment.

FIG. 11A is a side view illustrating a state in which lengths of the three sets of neutral wires 47, are made to be the same in the embodiment. FIG. 11B is a side view illustrating a state in which each of the three sets of neutral wires 47 is joined by crimping in the embodiment. As illustrated in FIG. 11A, lengths of the three sets of neutral wires 47, which are respectively extended from the three first fixation portions 56, from the first fixation portions 56 are made to be the same by cutting of one ends. By forming the first fixation portions 56, it is possible to easily make the lengths of the neutral wires 47 the same. Subsequently, as illustrated in FIG. 11B, each of the three sets of neutral wires 47 is joined by crimping via a splice terminal 52. Three neutral wires 47 are bundled into one set by a first fixation portion 56. Thus, when U-phase, V-phase, and W-phase neutral wires 47 are joined via a splice terminal 52, it is possible to prevent phases to be connected to each other from being joined wrongly, and workability in assembling is improved.

Figure 11C:
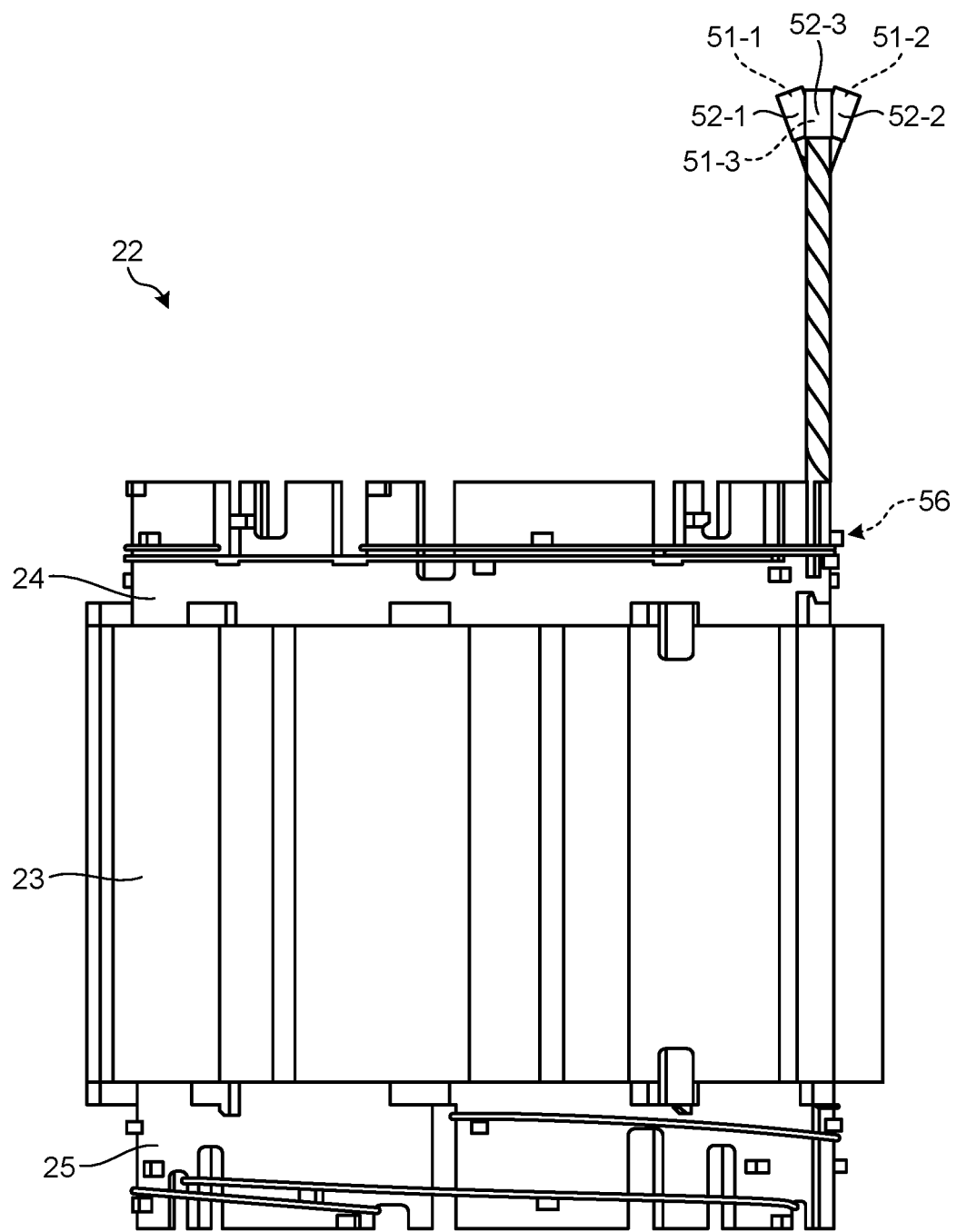
FIG. 11C is a side view illustrating a state in which the three sets of neutral wires are bundled in the embodiment.
Figure 11D:
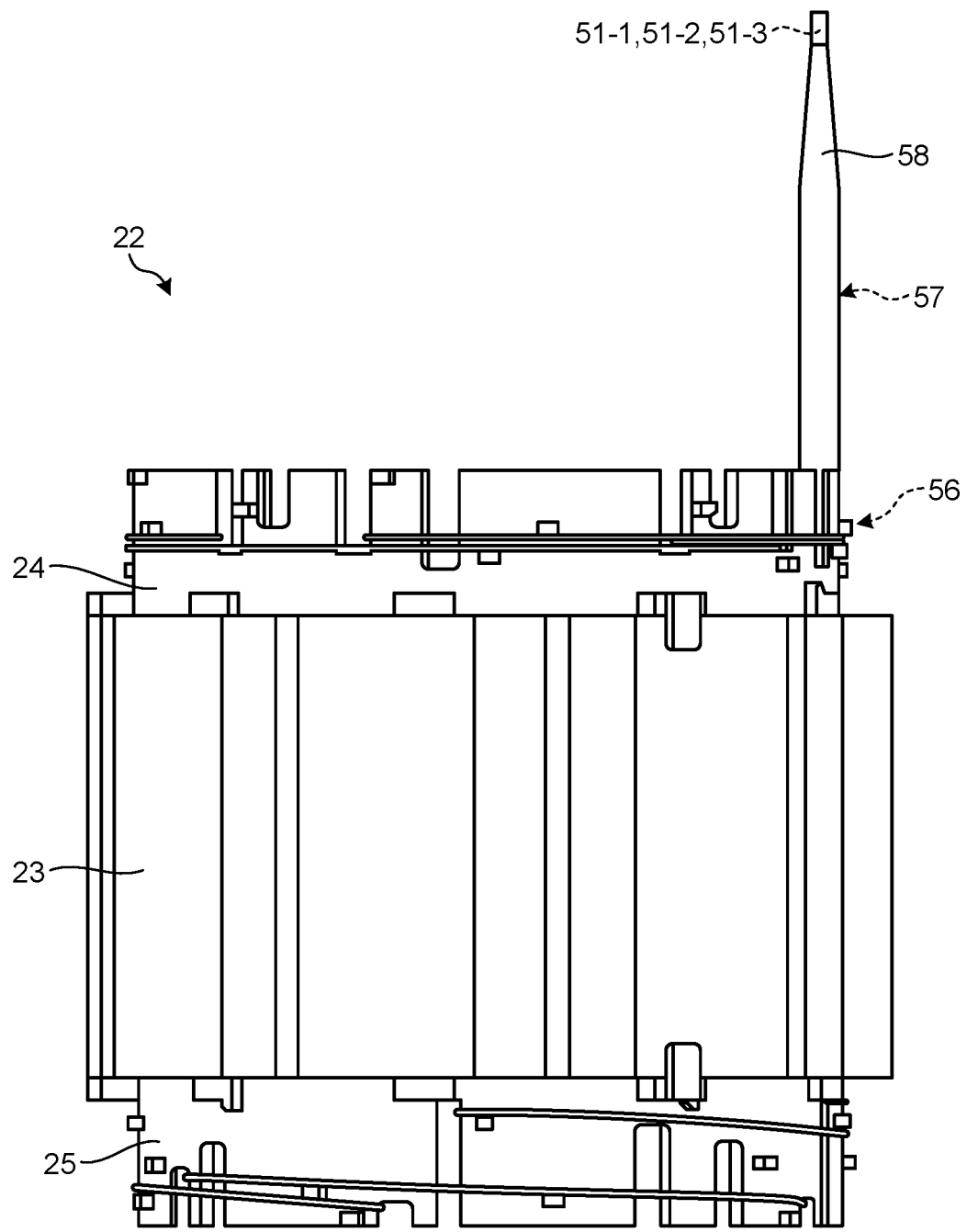
FIG. 11D is a side view illustrating a state in which the bundled neutral wires are covered with an insulating tube in the embodiment.

FIG. 11C is a side view illustrating a state in which the three sets of neutral wires 47 are bundled in the embodiment. FIG. 11D is a side view illustrating a state in which the bundled neutral wires 47 are covered with the insulating tube 58 in the embodiment. As illustrated in FIG. 11C, a bundled second fixation portion 57 is formed by twisting together of the three sets of neutral wires 47. By forming of the second fixation portion 57, tension on the neutral wires 47 routed along the outer peripheral wall portion 41 of the upper insulator 24, is further increased, and movement of the neutral wires 47 due to a vibration of the stator 22 during an operation of the compressor 1, is controlled.

Note that in the present embodiment, three sets of neutral wires 47 are bundled and twisted together up to the splice terminals 52 (neutral point 51), whereby the second fixation portion 57 is formed. However, this structure is not a limitation, and a second fixation portion 57 may be formed by twisting of only a part of bundled three sets of neutral wires 47.

Subsequently, as illustrated in FIG. 11D, the second fixation portion 57, in which the three sets of neutral wires 47 are bundled, and the splice terminal 52, are covered with the insulating tube 58. Thus, the first fixation portions 56 to the neutral points 51 are insulated. Since the three sets of neutral wires 47 are bundled by the second fixation portion 57, it becomes possible to insulate the three sets of neutral wires 47 collectively with one insulating tube 58 without performing insulation thereof individually, and to control an increase in a manufacturing cost. As illustrated in FIG. 2, the second fixation portion 57 covered with the insulating tube 58, passes through a slit 44 as a notch from an outer peripheral side of the upper insulator 24, and is inserted into a gap G between adjacent winding portions 45.

The second fixation portion 57 is inserted and arranged, on an outer peripheral side in a radial direction of the stator 22, in the gap G between the winding portions 45, and interference with the rotor 21 is controlled. Also, the second fixation portion 57 is inserted in a direction of a central axis of the stator 22, that is, in a vertical direction in the compressor 1. A neutral point 51 side of the insulating tube 58, is formed in a flat band shape. The flat insulating tube 58 is inserted in the direction of the central axis of the stator 22, and is prevented from becoming flow resistance for a refrigerant or refrigeration oil passing through the gap G. Thus, it is possible to control an increase in a flow velocity of the refrigeration oil passing through the gap G, and to control an amount of the refrigeration oil discharged to the outside of the compressor 1.

As described above, in the winding wires 46 of the three-phase motor 6 of the embodiment, the plurality of neutral wires 47 includes a plurality of first fixation portions 56 in which the plurality of neutral wires 47 is fixed to each other in positions that are on a side of the winding portions 45 compared to the plurality of neutral points 51, and a second fixation portion 57 in which the plurality of neutral wires 47 is fixed to each other from the plurality of first fixation portions 56 to the plurality of neutral points 51. For example, since three neutral wires 47 connected at a neutral point 51 are fixed to each other as a set by a first fixation portion 56, and three sets of neutral wires 47 are fixed to each other by the second fixation portion 57, nine neutral wires 47 can be easily handled, and a mistake in a combination of three neutral wires 47 connected in a predetermined combination, can be prevented compared to a case where nine neutral wires 47 are joined by soldering. Thus, the workability in assembling of the three-phase motor 6 can be improved, and efficiency of assembling work can be improved.

In addition, by twisting together of the three sets of neutral wires 47 fixed by the first fixation portions 56, the neutral wires 47 of each set can be twisted in a state of being regulated by the first fixation portion 56. Thus, work of twisting the nine neutral wires 47 together, becomes easier, and the second fixation portion 57 in which the nine neutral wires 47 are bundled, can be easily formed, for example, compared to a case where nine neutral wires 47 that are not fixed by first fixation portions 56, are bundled and twisted together.

Also, in the plurality of first fixation portions 56 in the three-phase motor 6 of the embodiment, the neutral wires 47 extended in the circumferential direction of the stator 22, are twisted together, whereby the plurality of neutral wires 47 is twisted together and fixed. As a result, the plurality of neutral wires 47 can be easily fixed to the stator 22 temporarily.

Also, the plurality of first fixation portions 56 in the three-phase motor 6 of the embodiment, is arranged in vicinity of each other in the circumferential direction of the stator 22. As a result, it becomes easier to twist together the plurality of sets of neutral wires 47, which are extended from the first fixation portions 56, into a bundle and to easily form the second fixation portion 57. Also, it becomes possible to cut the plurality of sets of neutral wires 47 while easily making lengths thereof from the first fixation portions 56 to the neutral points 51 the same.

Also, in the plurality of first fixation portions 56 in the three-phase motor 6 of the embodiment, a neutral wire 47 extended toward one side in the circumferential direction of the upper insulator 24, and a neutral wire 47 extended toward the other side in the circumferential direction of the upper insulator 24, are twisted together and fixed. As a result, the neutral wires 47 can be easily fixed to the upper insulator 24.

Also, in the second fixation portion 57 in the three-phase motor 6 of the embodiment, a plurality of sets of neutral wires 47 respectively connected at the plurality of neutral points 51, is twisted together into a bundle. As a result, it is possible to easily form the second fixation portion 57, in which the plurality of neutral wires 47 is bundled.

Also, the second fixation portion 57 in the three-phase motor 6 of the embodiment, is covered with the insulating tube 58, and inserted into a gap G between adjacent winding portions 45. As a result, movement of the second fixation portion 57 is controlled when the three-phase motor 6 is used, and the second fixation portion 57 can be stably held by the gap G in the stator 22. Also, since the second fixation portion 57 is covered with the insulating tube 58, it becomes possible to insulate the plurality of sets of neutral wires 47 collectively and to control an increase in a manufacturing cost of the three-phase motor 6 compared to a structure in which a plurality of sets of neutral wires 47 is individually insulated.

Also, the second fixation portion 57 in the three-phase motor 6 of the embodiment, is inserted to an outer peripheral side of the gap G in a radial direction of the stator 22. As a result, it is possible to avoid interference between the second fixation portion 57, inserted into the gap G, and the rotor 21.

Also, the second fixation portion 57 in the three-phase motor 6 of the embodiment, is inserted into the gap G between the adjacent winding portions 45 through a slit 44 from the outer peripheral side of the upper insulator 24. As a result, the second fixation portion 57 routed from the first fixation portions 56, is supported by the slit 44. Thus, movement of the second fixation portion 57 with respect to the upper insulator 24, is controlled, and stability of a mounting state of the second fixation portion 57 inserted into the gap G, can be further improved.

Note that a three-phase motor is applied to a rotary compressor in the present embodiment, but is not limited to the rotary compressor. Application to a scroll compressor is also possible. Also, a first fixation portion 56 is formed by twisting of a plurality of neutral wires 47, and a second fixation portion 57 is formed by twisting of a plurality of sets of neutral wires 47 in the present embodiment. However, this is not a limitation, and a first fixation portion 56 and a second fixation portion 57 may be formed by a fixing member such as a binder. Also, a winding procedure of a winding wire 46 is not limited to the present embodiment. For example, winding wires may be respectively wound around teeth.

REFERENCE SIGNS LIST

1 COMPRESSOR
3 SHAFT (ROTATING SHAFT)
5 COMPRESSION UNIT
6 THREE-PHASE MOTOR
21 ROTOR
22 STATOR
24 UPPER INSULATOR (INSULATOR)
32-1 FIRST STATOR CORE TOOTH PORTION (TOOTH)
32-2 SECOND STATOR CORE TOOTH PORTION (TOOTH)
32-3 THIRD STATOR CORE TOOTH PORTION (TOOTH)
32-4 FOURTH STATOR CORE TOOTH PORTION (TOOTH)
32-5 FIFTH STATOR CORE TOOTH PORTION (TOOTH)
41 OUTER PERIPHERAL WALL PORTION
44 SLIT (NOTCH)
45 WINDING PORTION
46 (46-U1 to 46-U3) A PLURALITY OF U-PHASE WINDING WIRES
46 (46-V1 to 46-V3) A PLURALITY OF V-PHASE WINDING WIRES
46 (46-W1 to 46-W3) A PLURALITY OF W-PHASE WINDING WIRES
47 (47-U1 to 47-U3) A PLURALITY OF U-PHASE NEUTRAL WIRES
47 (47-V1 to 47-V3) A PLURALITY OF V-PHASE NEUTRAL WIRES
47 (47-W1 to 47-W3) A PLURALITY OF W-PHASE NEUTRAL WIRES
43-U1 to 48-U3 A PLURALITY OF U-PHASE POWER WIRES
43-V1 to 48-V3 A PLURALITY OF V-PHASE POWER WIRES
48-W1 to 48-W3 A PLURALITY OF W-PHASE POWER WIRES
49-U1 FIRST U-PHASE CONNECTING WIRE PORTION
49-U2 SECOND U-PHASE CONNECTING WIRE PORTION
49-V1 FIRST V-PHASE CONNECTING WIRE PORTION
49-V2 SECOND V-PHASE CONNECTING WIRE PORTION
49-W1 FIRST W-PHASE CONNECTING WIRE PORTION
49-W2 SECOND W-PHASE CONNECTING WIRE PORTION
51 (51-1 to 51-3) NEUTRAL POINT
56 FIRST FIXATION PORTION
57 SECOND FIXATION PORTION
52 (52-1) FIRST SPLICE TERMINAL (CONNECTING MEMBER)
52 (52-2) SECOND SPLICE TERMINAL (CONNECTING MEMBER)
52 (52-3) THIRD SPLICE TERMINAL (CONNECTING MEMBER)
58 INSULATING TUBE (INSULATING MEMBER)
G GAP

The invention claimed is:

1. A motor comprising:
a rotor; and a stator that generates a magnetic field to rotate the rotor, wherein
the stator includes
a plurality of teeth,
a plurality of winding wires including a winding portion wound around each of the plurality of teeth, a neutral wire provided on one end side of the winding portion, and a power wire provided on an other end side of the winding portion, and
a plurality of neutral points at which a set of three neutral wires corresponding to each of three phases is electrically connected via a connecting member, and
the set of three neutral wires includes a plurality of first fixation portions in which the set of three neutral wires is fixed to each other in positions that are on a side of the winding portion compared to the plurality of neutral points, and a second fixation portion in which a plurality of sets of the neutral wires is bundled and fixed to each other from the plurality of first fixation portions to the plurality of neutral points.

2. The motor according to claim 1, wherein
in the plurality of first fixation portions, the neutral wires extended in a circumferential direction of the stator are twisted together and the three neutral wires are fixed to each other.

3. The motor according to claim 1, wherein
the plurality of first fixation portions is arranged in vicinity of each other in a circumferential direction of the stator.

4. The motor according to claim 1, further comprising
an insulator fixed to each end of the stator, wherein
in the plurality of first fixation portions, three neutral wires are routed and fixed together onto the insulator.

5. The motor according to claim 4,
in the plurality of first fixation portions, a neutral wire extended to one side in a circumferential direction of the insulator and a neutral wire extended to an other side in the circumferential direction together, are twisted and fixed.

6. The motor according to claim 1, wherein
in the second fixation portion, the plurality of sets of the neutral wires respectively connected at the plurality of neutral points, is twisted together into a bundle.

7. The motor according to claim 1, wherein
the second fixation portion is covered with an insulating member and is inserted into a gap between the winding portions adjacent to each other.

8. The motor according to claim 5, wherein
the insulator has a notch that makes an outer peripheral side of the insulator and the winding portion communicate with each other, and
the second fixation portion is inserted into a gap between the winding portions, which are adjacent to each other, from the outer peripheral side of the insulator through the notch.

9. A compressor comprising:
a motor that includes:
- a rotor; and a stator that generates a magnetic field to rotate the rotor, wherein the stator includes
  a plurality of teeth,
  a plurality of winding wires including a winding portion wound around each of the plurality of teeth, a neutral wire provided on one end side of the winding portion, and a power wire provided on an other end side of the winding portion, and
  a plurality of neutral points at which a set of three neural wires corresponding to each of three phases is electrically connected via a connecting member,
  the set of three neutral wires includes a plurality of first fixation portions in which the set of three neutral wires is fixed to each other in positions that are on a side of the winding portion compared to the plurality of neutral points, and a second fixation portion in which a plurality of sets of the neutral wires is bundled and fixed to each other from the plurality of first fixation portions to the plurality of neutral points; and
a compression unit that compresses a refrigerant when the rotor rotates a rotating shaft.

* * * * *